(12) United States Patent
Tani et al.

(10) Patent No.: US 6,996,511 B2
(45) Date of Patent: Feb. 7, 2006

(54) THREE-DIMENSIONAL MESH GENERATING METHOD, MAGNETIC FIELD ANALYSIS METHOD FOR ROTATING MACHINE, THREE-DIMENSIONAL MESH GENERATING DEVICE, MAGNETIC FIELD ANALYSIS DEVICE FOR ROTATING MACHINE, COMPUTER PROGRAM, AND RECORDING MEDIUM

(75) Inventors: Koji Tani, Osaka (JP); Tetsuo Ogawa, Osaka (JP)

(73) Assignee: The Japan Research Institute, Limited, Tokyo (JP)

( * ) Notice: Subject to any disclaimer, the term of this patent is extended or adjusted under 35 U.S.C. 154(b) by 0 days.

(21) Appl. No.: 10/488,466

(22) PCT Filed: Sep. 6, 2002

(86) PCT No.: PCT/JP02/09131

§ 371 (c)(1),
(2), (4) Date: Mar. 4, 2004

(87) PCT Pub. No.: WO03/023659

PCT Pub. Date: Mar. 20, 2003

(65) Prior Publication Data

US 2005/0055183 A1  Mar. 10, 2005

(30) Foreign Application Priority Data

Sep. 6, 2001  (JP) ............................ 2001-270957

(51) Int. Cl.
*G06T 17/20* (2006.01)
(52) U.S. Cl. ................. 703/13; 703/2; 703/18
(58) Field of Classification Search ............ 701/1, 701/2; 345/423, 424, 419, 420; 703/13, 703/18
See application file for complete search history.

(56) References Cited

U.S. PATENT DOCUMENTS

| | | | | | |
|---|---|---|---|---|---|
| 5,214,752 | A | * | 5/1993 | Meshkat et al. | 345/423 |
| 5,570,460 | A | * | 10/1996 | Ramanujam | 345/424 |
| 5,590,248 | A | * | 12/1996 | Zarge et al. | 345/421 |

(Continued)

FOREIGN PATENT DOCUMENTS

JP  9-27048  *  1/1997

(Continued)

OTHER PUBLICATIONS

Burow, et al., "Dependence of Torque Calculation on Mesh in Induction Machines", IEEE Transactions on Magnetics, V.31, No. 6, Nov. 1995.*

(Continued)

*Primary Examiner*—Burton Mullins
(74) *Attorney, Agent, or Firm*—Birch, Stewart, Kolasch & Birch, LLP

(57) ABSTRACT

A two-dimensional mesh is generated on a plane perpendicular to the rotation axis. At this time, a ring-shaped gap is provided between the rotor and the stator, and portions facing the ring-shaped gap are equally divided into the same number of parts. An initial three-dimensional mesh is generated by joining together a plurality of two-dimensional meshes in the direction of the rotation axis while rotating the two-dimensional meshes. A boundary surface is formed in a cylindrical gap composed of a stack of the ring-shaped gaps, and a three-dimensional mesh is generated by filling the cylindrical gap with a plurality of polyhedrons, including polyhedrons comprising each of surface elements constituting the stator-side mesh surface, rotor-side mesh surface and boundary surface as one face.

14 Claims, 18 Drawing Sheets

U.S. PATENT DOCUMENTS

| | | | |
|---|---|---|---|
| 5,671,343 A * | 9/1997 | Kondo et al. | 345/419 |
| 5,729,670 A * | 3/1998 | Strumolo et al. | 345/423 |
| 5,768,156 A * | 6/1998 | Tautges et al. | 716/20 |
| 5,844,564 A * | 12/1998 | Bennis et al. | 345/423 |
| 6,301,192 B1 * | 10/2001 | Reise | 367/11 |

FOREIGN PATENT DOCUMENTS

| | | | |
|---|---|---|---|
| JP | 10-255079 | * | 9/1998 |
| JP | 2001-155055 A | | 6/2001 |

OTHER PUBLICATIONS

Kometani et al. "3-D Analysis of Induction Motor with Skewed Slots Using Regular Coupling Mesh", IEEE Transactions on Magnetics. V.36, No. 4, Jul. 2000.*

Lowther, D., et al. "A comparison of 2D and 3D analysis methods for the prediction of cogging torque in an electrical machine having skewed slots", Compel. Bradford 2001, vol. 20, Issue 2, p. 570-581.□□.*

Bianchi et al., "Finite Element Analysis of Three-Phase Induction Motors: Comparison of Two Different Approaches", IEEE Transactions on Energy Conversion, V.14, No. 4, Dec. 1999.*

Mackerle, "2D and 3D finite element meshing and remeshing: A bibliography (1990-2001)", Engineering Computations. Bradford: 2001. V.18, Iss.7/8; p. 1180.*

□□Roger-Folch et al., "Analysis of skewed slots in induction machines by using 2D finite element method", Compel. Bradford: 1998. vol. 17, Iss.2; p. 212.*

Alotto et al. "Discontinuous finite element methods for the simulation of rotating electrical machines", Compel. Bradford: 2001. vol. 20, Iss.2; pp. 448-453.*

Ho, S.L. et al., IEEE Transactions on Magnetics, vol. 35, No. 3, pp. 1266 to 1269, Jun. 1, 1999.

Taniguchi et al., The Institute of Electrical Engineers of Japan Kaitenki Kenkyukai Shiryo, RM-00-110 to 119 121 to 138; pp. 157 to 161, Oct. 19, 2000.

* cited by examiner (a)

(d)

(b)

(e)

(c)

(a)

ROTOR STATOR (b)

G1

(a)

M1  G1

(b)

M2
M1  G1

(c)

M3
M2 M1  G1

(a)

(b)

(c)

(b)

(a)

(a)

(b)

(c)

THREE-DIMENSIONAL MESH GENERATING METHOD, MAGNETIC FIELD ANALYSIS METHOD FOR ROTATING MACHINE, THREE-DIMENSIONAL MESH GENERATING DEVICE, MAGNETIC FIELD ANALYSIS DEVICE FOR ROTATING MACHINE, COMPUTER PROGRAM, AND RECORDING MEDIUM

This application is the national phase under 35 U.S.C. § 371 of PCT International Application No. PCT/JP02/09131 which has an International filing date of Sep. 6, 2002, which designated the United States of America.

TECHNICAL FIELD

The present invention relates to: a method for generating a three-dimensional mesh representing a rotating machine having skew, including a spatial area, for the analysis of electromagnetic field using a finite element method; a three-dimensional mesh generating apparatus for use in implementing the method; a computer program for realizing a computer as the three-dimensional mesh generating apparatus; a memory product readable by a computer storing the computer program; a method for analyzing the magnetic field of a rotating machine by using a three-dimensional mesh; a magnetic field analyzing apparatus for use in implementing the method; a computer program for realizing a computer as the magnetic field analyzing apparatus; and a memory product readable by a computer storing the computer program.

BACKGROUND ART

Rotating machines are important parts that are incorporated and used in various apparatuses, and improvements are repeatedly made for high performance. In order to support the designing of a new rotating machine, numerical analysis of the performance by a finite element method is generally performed by changing the shape of the rotating machine.

The finite element method is a method for performing numerical calculation by representing an object to be analyzed by a combination of a plurality of polyhedral elements, and is widely used for the analysis of the structure of three-dimensional objects. In the case where the finite element method is used for the numerical analysis of a rotating machine, in order to analyze the magnetic field between a stator and a rotor, it is necessary to generate a three-dimensional mesh representing the spatial area between the stator and the rotor as well as the stator and the rotor by a combination of a plurality of polyhedral elements. Moreover, in order to analyze the magnetic field while rotating the rotor, it is necessary to take into account the rotational motion in generating the three-dimensional mesh.

Conventionally, a three-dimensional mesh of the rotating machine is generated as follows. A boundary surface in the form of a cylindrical surface is set in the spatial area of the rotating machine, and a space on the stator side and a space on the rotor side including the spatial area with the boundary surface therebetween are represented by combinations of a plurality of polyhedrons, respectively, on a two-dimensional plane perpendicular to the rotation axis to generate two-dimensional meshes. At this time, portions of the two-dimensional meshes on the stator side and the rotor side, which come into contact with the boundary surface, are equally divided in the rotation direction and arranged to match each other at the boundary surface. Next, the generated two-dimensional meshes are stacked in the direction of the rotation axis to generate a three-dimensional mesh representing the rotating machine including the spatial area. By shifting the three-dimensional mesh on the rotor side from the boundary surface by one element with respect to the stator side, the rotor can be rotated, and the magnetic field of the rotating machine can be analyzed while rotating the rotor.

Further, Japanese Patent Application Laid-Open No. 2001-155055 discloses a method for generating a three-dimensional mesh of a rotating machine by generating three-dimensional meshes on the stator side and the rotor side independently of each other, providing a gap between them, and generating a three-dimensional mesh of the gap by filling the gap with polyhedrons by an automatic element division method. In the case where a three-dimensional mesh generated by this method is used, analysis of the magnetic field of the rotating machine while rotating the rotor can be performed by regenerating a three-dimensional mesh of the gap whenever the rotor is rotated.

One of the problems of the rotating machine is the torque variation, which occurs because the magnitude of magnetic flux that generates the rotating force in the rotor changes depending on the positional relationship between the stator and the rotor, and this torque variation will cause vibration and noise of the rotating machine. In order to reduce the torque variation, used is a rotating machine having skew that is a structure of the stator or the rotor twisted in the direction of the rotation axis. However, in order to perform numerical analysis of the rotating machine having skew by the finite element method, there is the problem that it is impossible to use a conventional three-dimensional mesh generating method in which two-dimensional meshes generated on a plane perpendicular to the rotation axis are stacked in the direction of the rotation axis, because the shape of the rotating machine is not symmetric about the plane perpendicular to the rotation axis.

In addition, according to the method disclosed in Japanese Patent Application Laid-Open No. 2001-155055, since the three-dimensional meshes on the stator side and the rotor side are generated independently of each other, it is possible to generate a three-dimensional mesh of a rotating machine having skew, but this method has the problem that it takes a long time for calculation in the analysis because a three-dimensional mesh needs to be regenerated whenever rotation is performed, and the problem that a process for giving the three-dimensional mesh periodicity in the rotation direction is additionally required because the three-dimensional mesh regenerated whenever rotation is performed is irregular.

DISCLOSURE OF THE INVENTION

The present invention has been made with the aim of solving the above problems, and it is an object of the present invention to provide a three-dimensional mesh generating method capable of generating a three-dimensional mesh of a rotating machine having skew by providing a gap between a rotor and a stator, equally dividing both sides of the gap to generate two-dimensional meshes on the stator side and the rotor side on a two-dimensional plane perpendicular to the rotation axis, stacking the two-dimensional meshes while twisting them to generate an initial three-dimensional mesh having skew, forming a boundary surface between the stator side and the rotor side of the initial three-dimensional mesh by projecting a stator-side or rotor-side surface mesh, and filling the spaces between the boundary surface and the stator-side and rotor-side surface meshes with a plurality of polyhedrons including respective polyhedrons constituting the boundary surface and the respective surface meshes, and to provide a three-dimensional mesh generating apparatus for use in implementing the method, a computer program for realizing a computer as the three-dimensional mesh generating apparatus, a memory product readable by a computer storing the computer program, a method for analyzing the magnetic field of a rotating machine in a short calculation time by rotating the three-dimensional mesh on the rotor side from the boundary surface, a magnetic field analyzing apparatus for use in implementing the method, a computer program for realizing a computer as the magnetic field analyzing apparatus, and a memory product readable by a computer storing the computer program.

Another object of the present invention is to provide a three-dimensional mesh generating method capable of giving a three-dimensional mesh periodicity in the rotation direction, without requiring an additional process, by generating the three-dimensional mesh by associating each of surface elements constituting the surface meshes on the stator side and the rotor side with surface elements constituting the boundary surface, and filling the space between corresponding surface elements with polyhedrons, and to provide a three-dimensional mesh generating apparatus for use in implementing the method, a computer program for realizing a computer as the three-dimensional mesh generating apparatus, and a memory product readable by a computer storing the computer program.

A three-dimensional mesh generating method according to the first invention is a method for generating a three-dimensional mesh representing a rotating machine with a stator or a rotor having a twisted structure in a direction of a rotation axis of the rotor, including a spatial area between the stator and the rotor, by a combination of a plurality of polyhedrons, and characterized by: generating a two-dimensional mesh in which a ring-shaped gap is provided around the rotation axis in the spatial area, portions facing each other with the ring-shaped gap therebetween are equally divided into mutually equal number of parts, and a stator-side portion and a rotor-side portion, excluding the ring-shaped gap, are represented by a combination of a plurality of polyhedrons on a plane perpendicular to the rotation axis; generating an initial three-dimensional mesh by joining together a plurality of the two-dimensional meshes with the stator-side portion and the rotor-side portion relatively rotated on the rotation axis according to the twisted structure, in a direction of the rotation axis according to a same rule in the stator-side portion and the rotor-side portion; forming a boundary surface constructed by a mesh surface obtained by concentrically projecting, into a cylindrical gap composed of a stack of the ring-shaped gaps, any one of a stator-side mesh surface and a rotor-side mesh surface which face each other with the cylindrical gap therebetween; and filling spaces between the boundary surface and the stator-side mesh surface and rotor-side mesh surface with a plurality of polyhedrons, including polyhedrons comprising each of surface elements constituting the boundary surface, the stator-side mesh surface and the rotor-side mesh surface as one face, to generate the three-dimensional mesh.

A three-dimensional mesh generating method according to the second invention is characterized in that the two-dimensional mesh is composed of a combination of a plurality of quadrangles, and the initial three-dimensional mesh is generated by joining together a plurality of the two-dimensional meshes in the direction of the rotation axis so that corresponding nodes in the two-dimensional meshes are connected by a straight line.

A three-dimensional mesh generating method according to the third invention is characterized by dividing each of quadrangular elements constituting the boundary surface into two triangular elements arranged in a direction in which the boundary surface is twisted with respect to the stator-side mesh surface or the rotor-side mesh surface; connecting each of nodes constituting the stator-side mesh surface and the rotor-side mesh surface to a closest node among a plurality of nodes constituting the boundary surface by a straight line; and filling a space between each of surface elements constituting the stator-side mesh surface and rotor-side mesh surface and a combination of the two triangular elements connected to the surface element by straight lines, with four tetrahedrons, including two tetrahedrons comprising each of the two triangular elements as one face, and one quadrangular pyramid comprising the surface element as a base.

A three-dimensional mesh generating method according to the fourth invention is a method for generating a three-dimensional mesh representing a rotating machine, including a spatial area between a stator and a rotor, by a combination of a plurality of polyhedrons by a computer, and characterized by comprising steps of receiving from an input unit and storing into a storage unit an initial three-dimensional mesh in which a cylindrical gap is provided in the spatial area between the stator and the rotor of the rotating machine, portions facing each other with the cylindrical gap therebetween are divided into mutually equal lengths perpendicular to a rotation axis of the rotating machine in a direction of the rotation axis and equally divided into mutually equal number of parts in a direction around the rotation axis, and a stator-side portion and a rotor-side portion of the rotating machine, excluding the cylindrical gap, are represented by a combination of a plurality of polyhedrons; forming a boundary surface by a mesh surface obtained by concentrically projecting, into the cylindrical gap, any one of a stator-side mesh surface and a rotor-side mesh surface which face each other with the cylindrical gap therebetween, and storing the boundary surface into the storage unit; dividing each of quadrangular elements constituting the boundary surface into two triangular elements arranged in a direction tilted with respect to each of quadrangular elements constituting the stator-side mesh surface or the rotor-side mesh surface, and storing them into the storage unit; connecting each of nodes constituting the stator-side mesh surface and the rotor-side mesh surface to a closest node among a plurality of nodes constituting the boundary surface by a straight line, and storing them into the storage unit; and filling a space between each of surface elements constituting the stator-side mesh surface and rotor-side mesh surface and a combination of the two triangular elements connected to the surface element by straight lines, with four tetrahedrons, including two tetrahedrons comprising each of the two triangular elements as one face, and one quadrangular pyramid comprising the surface element as a base, and storing them into the storage unit.

A magnetic field analyzing method for a rotating machine according to the fifth invention is a method for analyzing the magnetic field of a rotating machine by a finite element method using a three-dimensional mesh representing the rotating machine, including a spatial area between a stator and a rotor, by a combination of a plurality of polyhedrons, and characterized by generating a three-dimensional mesh representing a rotating machine to be analyzed, by using the three-dimensional mesh generating method of any one of the first through fourth inventions, rotating a rotor side of the three-dimensional mesh by shifting the elements from the boundary surface, and analyzing the magnetic field by the finite element method.

A three-dimensional mesh generating apparatus according to the sixth invention is an apparatus for generating a three-dimensional mesh representing a rotating machine, including a spatial area between a stator and a rotor, by a combination of a plurality of polyhedrons, and characterized by comprising: means for receiving an initial three-dimensional mesh in which a cylindrical gap is provided in the spatial area between the stator and the rotor of the rotating machine, portions facing each other with the cylindrical gap therebetween are divided into mutually equal lengths perpendicular to a rotation axis of the rotating machine in a direction of the rotation axis and equally divided into mutually equal number of parts in a direction around the rotation axis, and a stator-side portion and a rotor-side portion of the rotating machine, excluding the cylindrical gap, are represented by a combination of a plurality of polyhedrons; means for forming a boundary surface by a mesh surface obtained by concentrically projecting, into the cylindrical gap, any one of a stator-side mesh surface and a rotor-side mesh surface which face each other with the cylindrical gap therebetween; means for dividing each of quadrangular elements constituting the boundary surface into two triangular elements arranged in a direction in which the boundary surface is tilted with respect to the stator-side mesh surface or the rotor-side mesh surface; means for connecting each of nodes constituting the stator-side mesh surface and the rotor-side mesh surface to a closest node among a plurality of nodes constituting the boundary surface by a straight line; and means for filling a space between each of surface elements constituting the stator-side mesh surface and rotor-side mesh surface and a combination of the two triangular elements connected to the surface element by straight lines, with four tetrahedrons, including two tetrahedrons comprising each of the two triangular elements as one face, and one quadrangular pyramid comprising the surface element as a base.

A magnetic field analyzing apparatus for a rotating machine according to the seventh invention is an apparatus for analyzing a magnetic field of a rotating machine by a finite element method using a three-dimensional mesh representing the rotating machine, including a spatial area between a stator and a rotor, by a combination of a plurality of polyhedrons, and characterized by comprising: means for generating a three-dimensional mesh representing a rotating machine to be analyzed, by using the three-dimensional mesh generating apparatus of the sixth invention; and means for rotating a rotor side of the three-dimensional mesh by shifting the elements from the boundary surface, and analyzing the magnetic field by the finite element method.

A computer program according to the eighth invention is a computer program for causing a computer to generate a three-dimensional mesh representing a rotating machine, including a spatial area between a stator and a rotor, by a combination of a plurality of polyhedrons, by using an initial three-dimensional mesh in which a cylindrical gap is provided in the spatial area between the stator and the rotor of the rotating machine, portions facing each other with the cylindrical gap therebetween are divided into mutually equal lengths perpendicular to a rotation axis of the rotating machine in a direction of the rotation axis and equally divided into mutually equal number of parts in a direction around the rotation axis, and a stator-side portion and a rotor-side portion of the rotating machine, excluding the cylindrical gap, are represented by a combination of a plurality of polyhedrons, and characterized by comprising steps of: causing the computer to form a boundary surface by a mesh surface obtained by concentrically projecting, into the cylindrical gap, any one of a stator-side mesh surface and a rotor-side mesh surface which face each other with the cylindrical gap therebetween; causing the computer to divide each of quadrangular elements constituting the boundary surface into two triangular elements arranged in a direction in which the boundary surface is tilted with respect to the stator-side mesh surface or the rotor-side mesh surface; causing the computer to connect each of nodes constituting the stator-side mesh surface and the rotor-side mesh surface to a closest node among a plurality of nodes constituting the boundary surface by a straight line; and causing the computer to fill a space between each of surface elements constituting the stator-side mesh surface and rotor-side mesh surface and a combination of the two triangular elements connected to the surface element by straight lines, with four tetrahedrons, including two tetrahedrons comprising each of the two triangular elements as one face, and one quadrangular pyramid comprising the surface element as a base.

A computer program according to the ninth invention is a computer program for causing a computer to analyze a magnetic field of a rotating machine by a finite element method using a three-dimensional mesh representing a rotating machine, including a spatial area between a stator and a rotor, by a combination of a plurality of polyhedrons, and characterized by comprising steps of: causing the computer to generate a three-dimensional mesh representing a rotating machine to be analyzed, by using the computer program of the eighth invention; and causing the computer to rotate a rotor side of the three-dimensional mesh by shifting the elements from the boundary surface and analyze the magnetic field by the finite element method.

A computer-readable memory product according to the tenth invention is a memory product readable by a computer storing a computer program for causing a computer to generate a three-dimensional mesh representing a rotating machine, including a spatial area between a stator and a rotor, by a combination of a plurality of polyhedrons, by using an initial three-dimensional mesh in which a cylindrical gap is provided in the spatial area between the stator and the rotor of the rotating machine, portions facing each other with the cylindrical gap therebetween are divided into mutually equal lengths perpendicular to a rotation axis of the rotating machine in a direction of the rotation axis and equally divided into mutually equal number of parts in a direction around the rotation axis, and a stator-side portion and a rotor-side portion of the rotating machine, excluding the cylindrical gap, are represented by a combination of a plurality of polyhedrons, and characterized by storing a computer program comprising steps of: causing the computer to form a boundary surface by a mesh surface obtained by concentrically projecting, into the cylindrical gap, any one of a stator-side mesh surface and a rotor-side mesh surface which face each other with the cylindrical gap therebetween; causing the computer to divide each of quadrangular elements constituting the boundary surface into two triangular elements arranged in a direction in which the boundary surface is tilted with respect to the stator-side mesh surface or the rotor-side mesh surface; causing the computer to connect each of nodes constituting the stator-side mesh surface and the rotor-side mesh surface to a closest node among a plurality of nodes constituting the boundary surface by a straight line; and causing the computer to fill a space between each of surface elements constituting the stator-side mesh surface and rotor-side mesh surface and a combination of the two triangular elements connected to the surface element by straight lines, with four tetrahedrons, including two tetrahedrons comprising each of the two triangular elements as one face, and one quadrangular pyramid comprising the surface element as a base.

A computer-readable memory product according to the eleventh invention is a memory product readable by a computer storing a computer program for causing a computer to analyze a magnetic field of a rotating machine by a finite element method using a three-dimensional mesh representing a rotating machine, including a spatial area between a stator and a rotor, by a combination of a plurality of polyhedrons, and characterized by storing a computer program comprising steps of: causing the computer to generate a three-dimensional mesh representing a rotating machine to be analyzed, by using the computer program of the tenth invention; and causing the computer to rotate a rotor side of the three-dimensional mesh by shifting the elements from the boundary surface and analyze the magnetic field by the finite element method.

FIG. 1 is an explanatory view showing the procedure of a three-dimensional mesh generating method of the first invention. In the first invention, a ring-shaped gap G1 is provided between the rotor and the stator on a two-dimensional plane perpendicular to the rotation axis as shown in FIG. 1(a), and both sides of the ring-shaped gap G1 are equally divided to generate a two-dimensional mesh of the stator side and the rotor side as shown in FIG. 1(b). Next, as shown in FIG. 1(c), an initial three-dimensional mesh having skew is generated by joining together the two-dimensional meshes with the stator side and the rotor side relatively rotated according to the skew structure, in the direction of the rotation axis. Next, as shown in FIG. 1(d), a boundary surface SL is formed by projecting, into the cylindrical gap, any one of a stator-side mesh surface ST and a rotor-side mesh surface RT which face each other with a cylindrical gap G2 therebetween. Next, a three-dimensional mesh is generated as shown in FIG. 1(e) by filing the cylindrical gap G2 with a plurality of polyhedrons including polyhedrons comprising each of surface elements constituting the boundary surface SL, the stator-side mesh surface ST and the rotor-side mesh surface RT as one face. Since portions of the stator side and the rotor side of the three-dimensional mesh which come into contact with each other at the boundary surface are composed of elements having mutually equal size in the rotation direction, it is possible to rotate the rotor side of a three-dimensional mesh representing a rotating machine having skew by shifting the elements from the boundary surface.

In the second invention, the two-dimensional mesh is composed of quadrangles, an initial three-dimensional mesh is generated by connecting corresponding nodes in the two-dimensional meshes, and thus each element of the initial three-dimensional mesh is a hexahedron. In the infinite element method, since the calculation accuracy is improved by using hexahedral elements than by using tetrahedral elements, it is possible to generate a three-dimensional mesh with high calculation accuracy by this method.

In the third invention, each of the surface elements constituting the stator-side mesh surface ST and the rotor-side mesh surface RT is associated with surface elements constituting the boundary surface SL, and the space between corresponding surface elements is filled with one quadrangular pyramid and four tetrahedrons. Consequently, the three-dimensional mesh is made periodic in the rotation direction without requiring an additional process.

In the fourth, sixth, eighth and tenth inventions, input of an initial three-dimensional mesh having a cylindrical gap between the stator-side portion and the rotor-side portion is received, a boundary surface SL is formed by projecting, into the cylindrical gap G2, any one of a stator-side mesh surface ST and a rotor-side mesh surface RT which face each other with the cylindrical gap G2 therebetween, each of surface elements constituting the stator-side mesh surface ST and the rotor-side mesh surface RT is associated with surface elements constituting the boundary surface SL, and the space between corresponding surface elements is filled with polyhedrons including one quadrangular pyramid and four tetrahedrons. Consequently, even for a three-dimensional mesh representing a rotating machine having skew, it is possible to generate a three-dimensional mesh that allows rotation of the rotor side by shifting the elements from the boundary surface, and has periodicity in the rotation direction, in high calculation accuracy.

In the fifth, seventh, ninth, and eleventh inventions, since the magnetic field of the rotating machine is analyzed by the finite element method using the generated three-dimensional mesh, it is possible to perform accurate magnetic field analysis with shorter calculation time.

BEST MODE FOR CARRYING OUT THE INVENTION

The following description will specifically explain the present invention with reference to the drawings illustrating an embodiment thereof.

Figure 1:
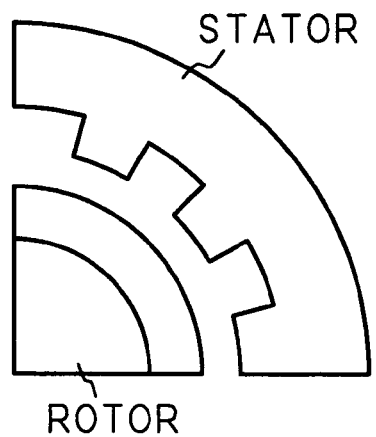
FIG. 1 is an explanatory view showing the procedure of a three-dimensional mesh generating method according to the first invention.
Figure 1:
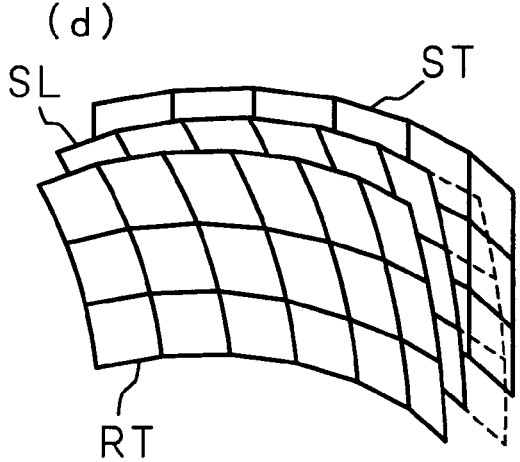
Figure 1:
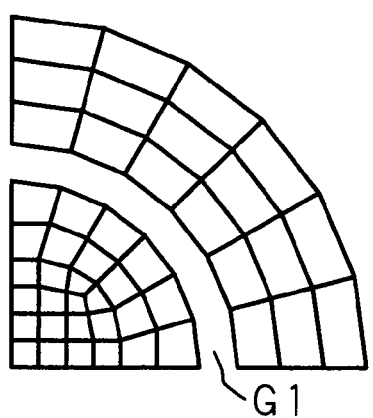
Figure 1:
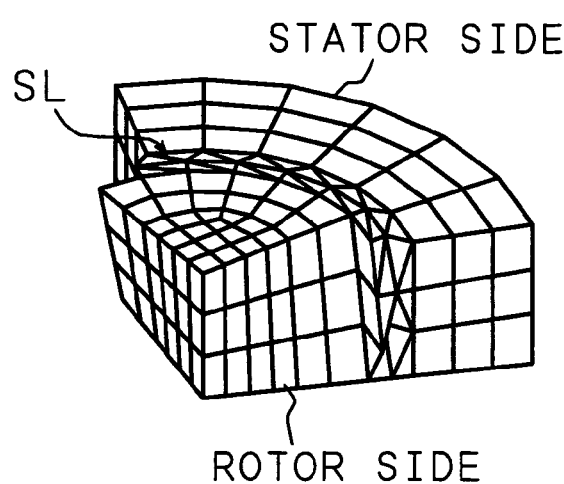
Figure 1:
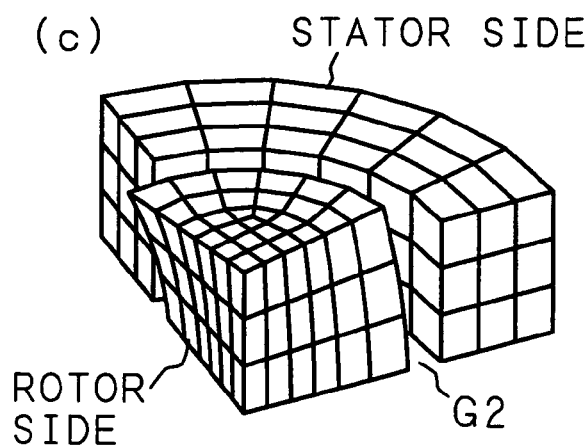
Figure 2:
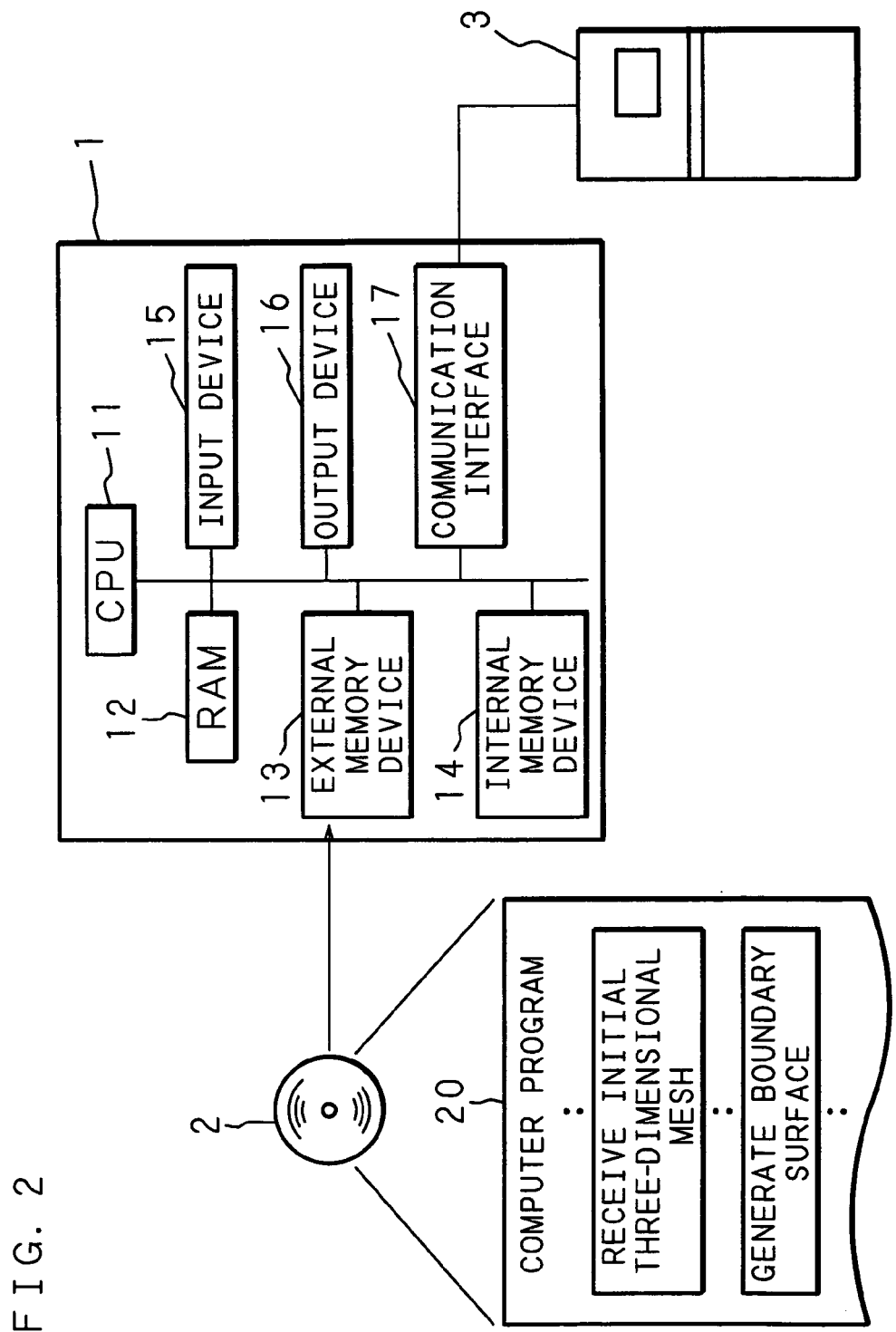
FIG. 2 is a block diagram showing a three-dimensional mesh generating apparatus according to the present invention.

FIG. 2 is a block diagram showing a three-dimensional mesh generating apparatus according to the present invention. In the figure, 1 represents a three-dimensional mesh generating apparatus of the present invention implemented using a computer, which comprises: a CPU 11 for performing operations; a RAM 12; an external memory device 13 such as a CD-ROM drive; and an internal memory device 14 such as a hard disk, reads a computer program 20 of the present invention from a memory product 2 such as a CD-ROM of the present invention by the external memory device 13, stores the read computer program 20 into the internal memory device 14, and loads the computer program 20 into the RAM 12, and the CPU 11 executes processes necessary for the three-dimensional mesh generating apparatus 1, based on the computer program 20. The three-dimensional mesh generating apparatus 1 comprises an input device 15 such as a keyboard or a mouse, and an output device 16 such as a liquid crystal display or a CRT display, and receives operations, such as input of data, from an operator.

Moreover, the three-dimensional mesh generating apparatus 1 comprises a communication interface 17, and may be arranged to download the computer program 20 of the present invention from a server device 3 connected to the communication interface 17 and execute the processes by the CPU 11.

Figure 3:
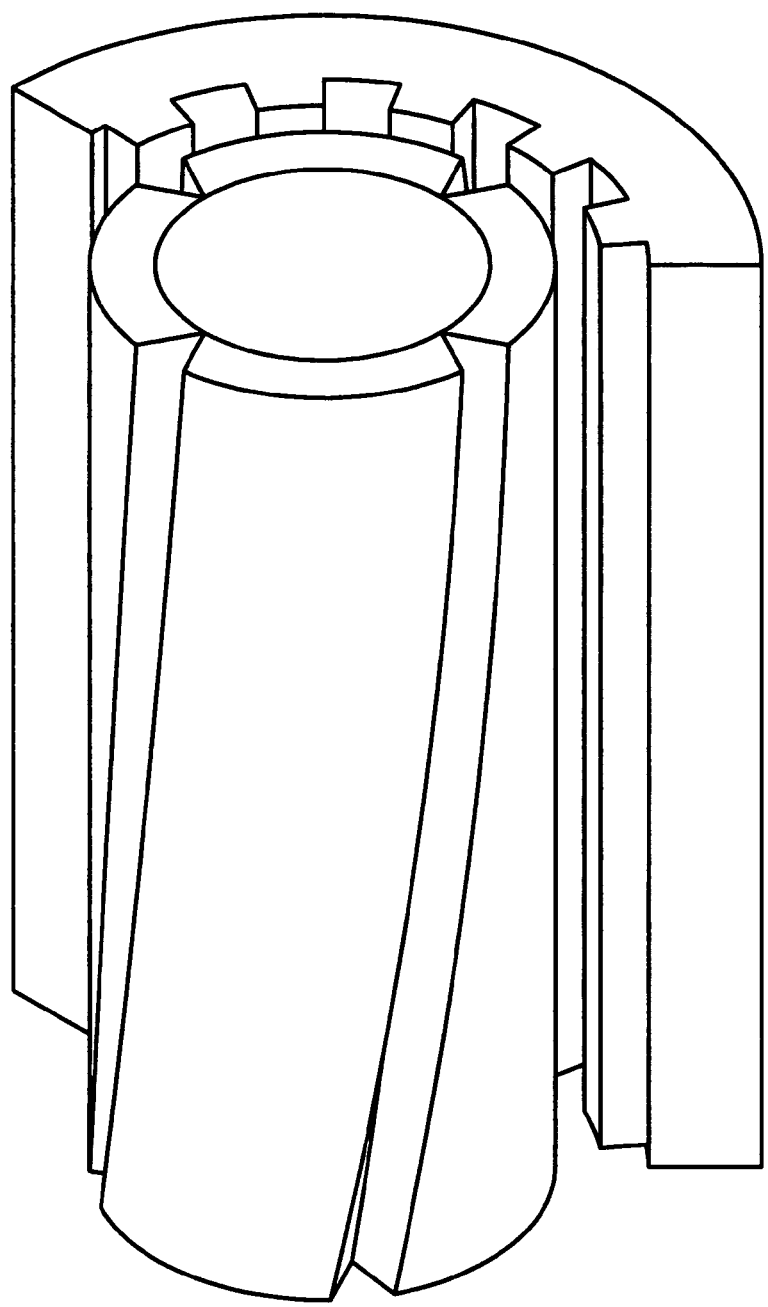
FIG. 3 is a partially cut perspective view showing an example of the structure of a rotating machine having skew.

FIG. 3 is a partially cut perspective view showing an example of the structure of a rotating machine having skew. A rotor having a permanent magnet is positioned in the center of the rotating machine, a stator using an electromagnet is positioned around the rotor, and the rotor has skew. The change in the magnetic field with respect to rotation which affects the whole rotor is reduced by the skew, and the torque variation of the rotating machine becomes smaller.

The following description will explain a three-dimensional mesh generating method of the present invention by illustrating the generation of a three-dimensional mesh representing the rotating machine shown in FIG. 3 as an example.

Figure 4:
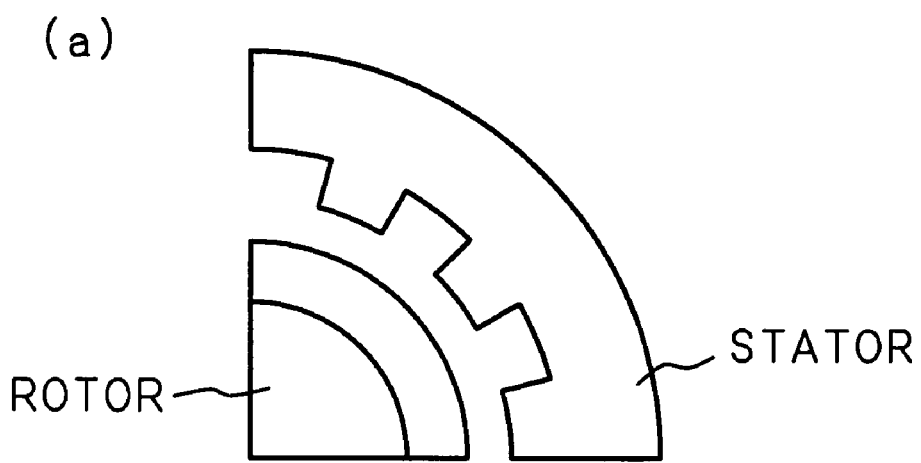
FIG. 4 is a schematic view showing an example of a two-dimensional mesh.
Figure 4:
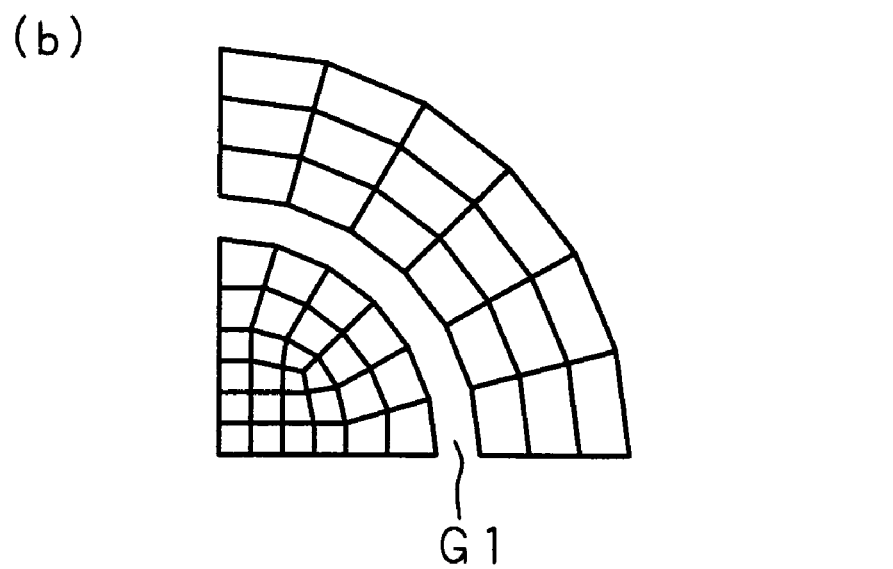

First, a two-dimensional mesh is generated by an operation of an operator using a CAD, etc. FIG. 4 is a schematic view showing an example of the two-dimensional mesh, and one fourth of the entire mesh is illustrated in the figure. In response to the operation of the operator, a cross sectional shape model representing a cross section of the rotating machine as shown in FIG. 4(a) is created using a CAD, etc., a ring-shaped gap G1 is provided between the rotor and the stator, and portions other than the ring-shaped gap G1 are divided into a plurality of quadrangles as shown in FIG. 4(b) to generate a two-dimensional mesh. At this time, a portion on the rotor side and a portion on the stator side which face each other with the ring-shaped gap G1 therebetween are divided into mutually equal number of parts. Note that although quadrangles are mentioned as polyhedrons constituting the two-dimensional mesh, it may be possible to divide the portions into triangles.

Figure 5:
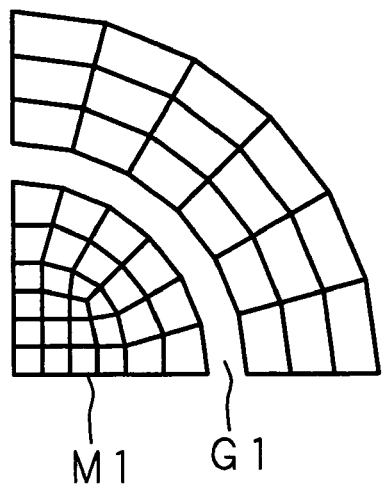
FIG. 5 is a schematic view for explaining the process of generating an initial three-dimensional mesh.
Figure 5:
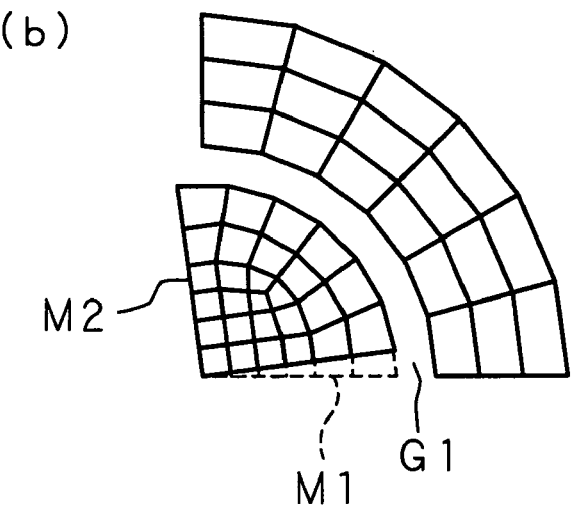
Figure 5:
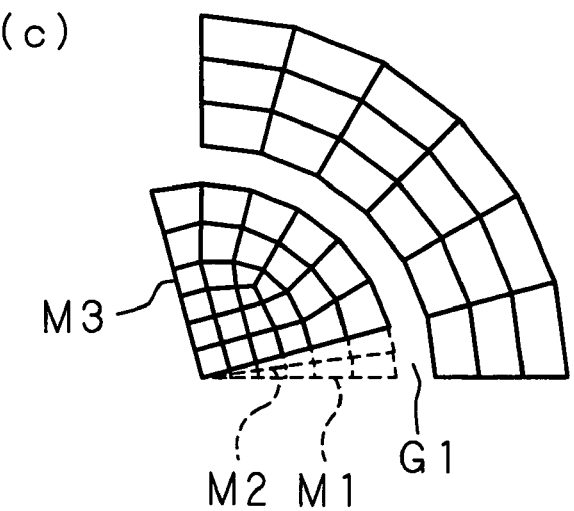
Figure 6:
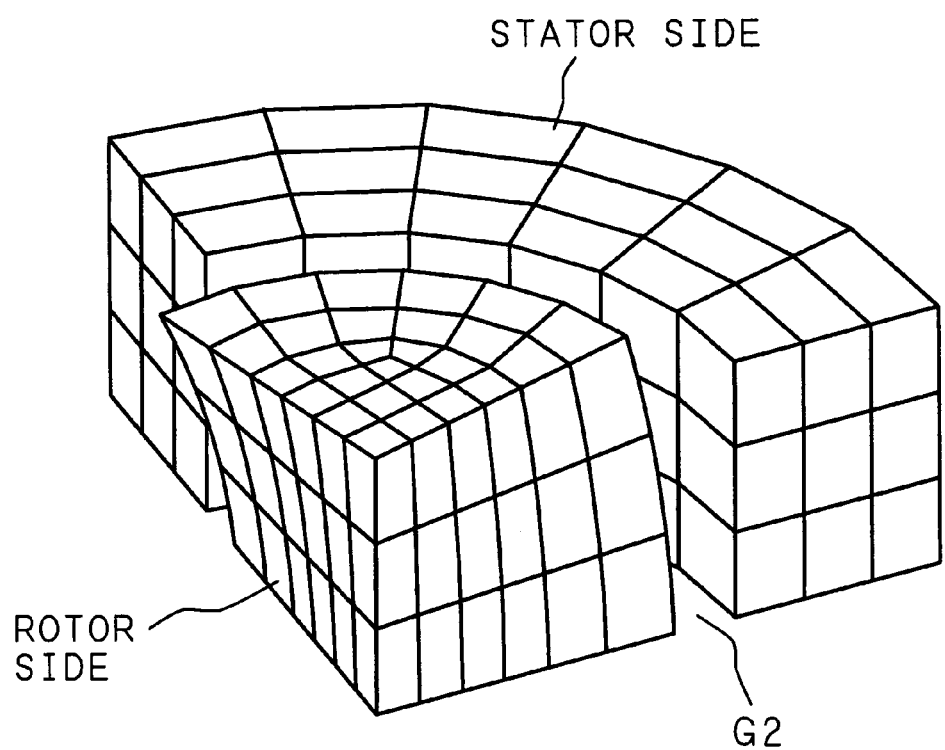
FIG. 6 is a perspective view showing a part of the initial three-dimensional mesh.

Next, in response to the operation of the operator, the two-dimensional meshes generated are joined together in the direction of the rotation axis to generate an initial three-dimensional mesh. FIG. 5 is a schematic view for explaining the processes of generating the initial three-dimensional mesh. First, one layer of two-dimensional mesh as shown in FIG. 5(a) is stacked in the direction of the rotation axis, and the rotor side of the two-dimensional mesh is rotated according to the structure of the skew. In the figure, M1 represents the first two-dimensional mesh, and M2 represents the stacked two-dimensional mesh. Next, corresponding nodes in the two-dimensional meshes are connected by a straight line between the stacked two-dimensional meshes to generate one layer of initial three-dimensional mesh. Further, as shown in FIG. 5(c), the next two-dimensional mesh M3 is stacked and the rotor side is rotated, and the same operation is repeated until the initial three-dimensional mesh representing the structure of the rotating machine is completed. FIG. 6 is a perspective view showing a part of the initial three-dimensional mesh. On the stator side, the initial three-dimensional mesh is generated by stacking two-dimensional meshes parallel to the rotation axis, while, on the rotor side, the initial three-dimensional mesh having a twisted structure according to the structure of the skew is generated. A cylindrical gap G2 is generated between the stator side and the rotor side by a stack of the ring-shaped gaps G1.

Figure 7:
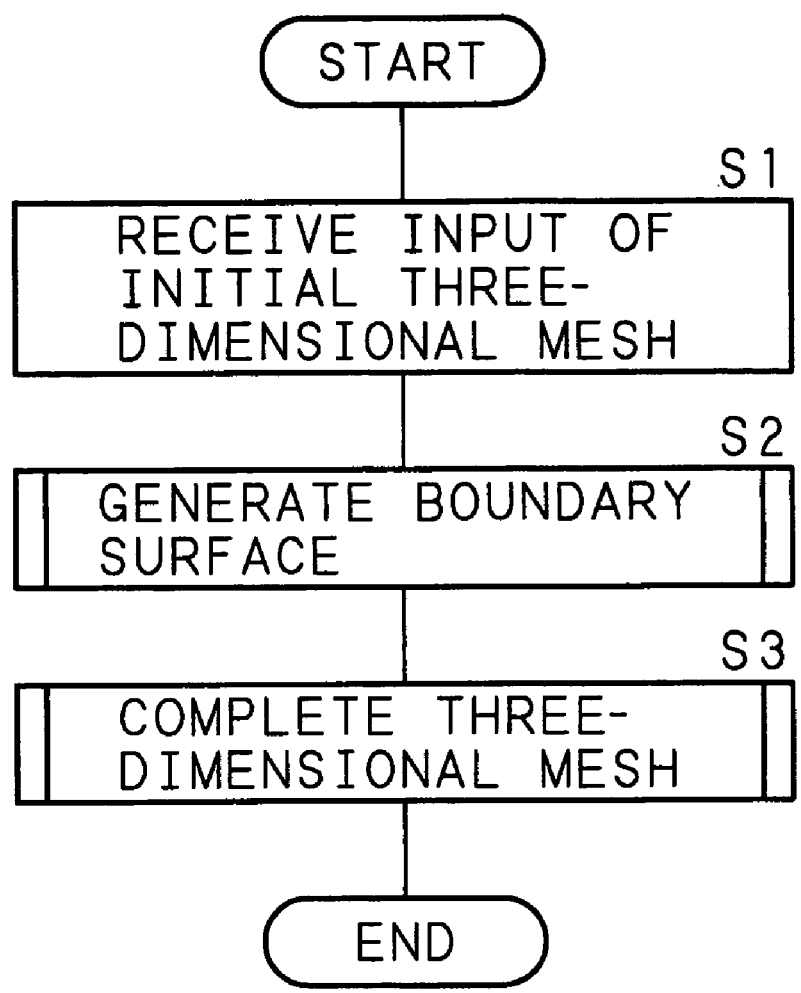
FIG. 7 is a flowchart for explaining the flow of processes performed by the three-dimensional mesh generating apparatus.

Next, a three-dimensional mesh is generated by the processes using the three-dimensional mesh generating apparatus 1. FIG. 7 is a flowchart for explaining the flow of processes performed by the three-dimensional mesh generating apparatus 1. First, the three-dimensional mesh generating apparatus 1 receives input of the initial three-dimensional mesh representing the structure of the rotating machine entered by the operation of the operator (S1).

Figure 8:
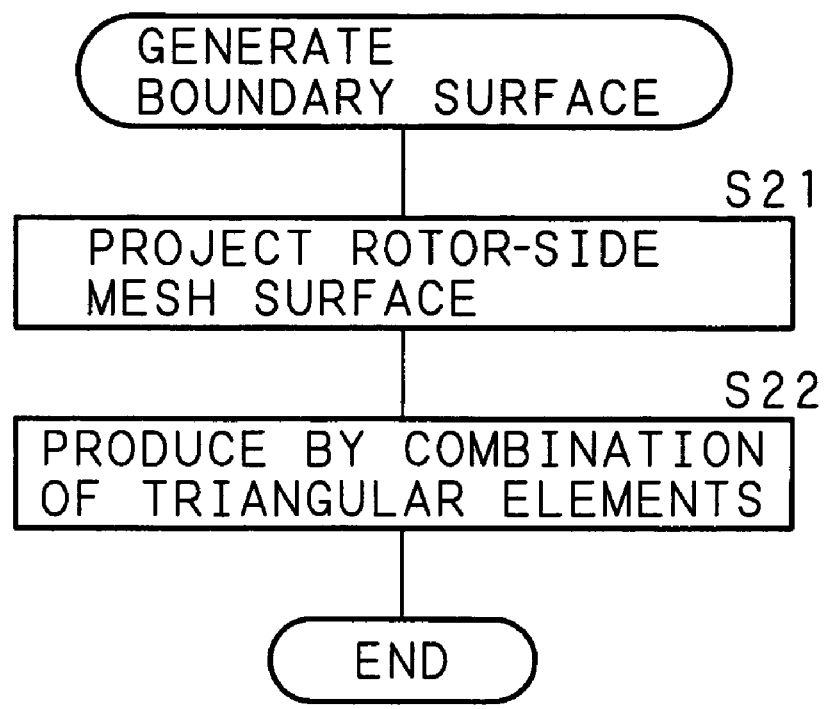
FIG. 8 is a flowchart for explaining the procedure of a sub-routine for generating a boundary surface.
Figure 9:
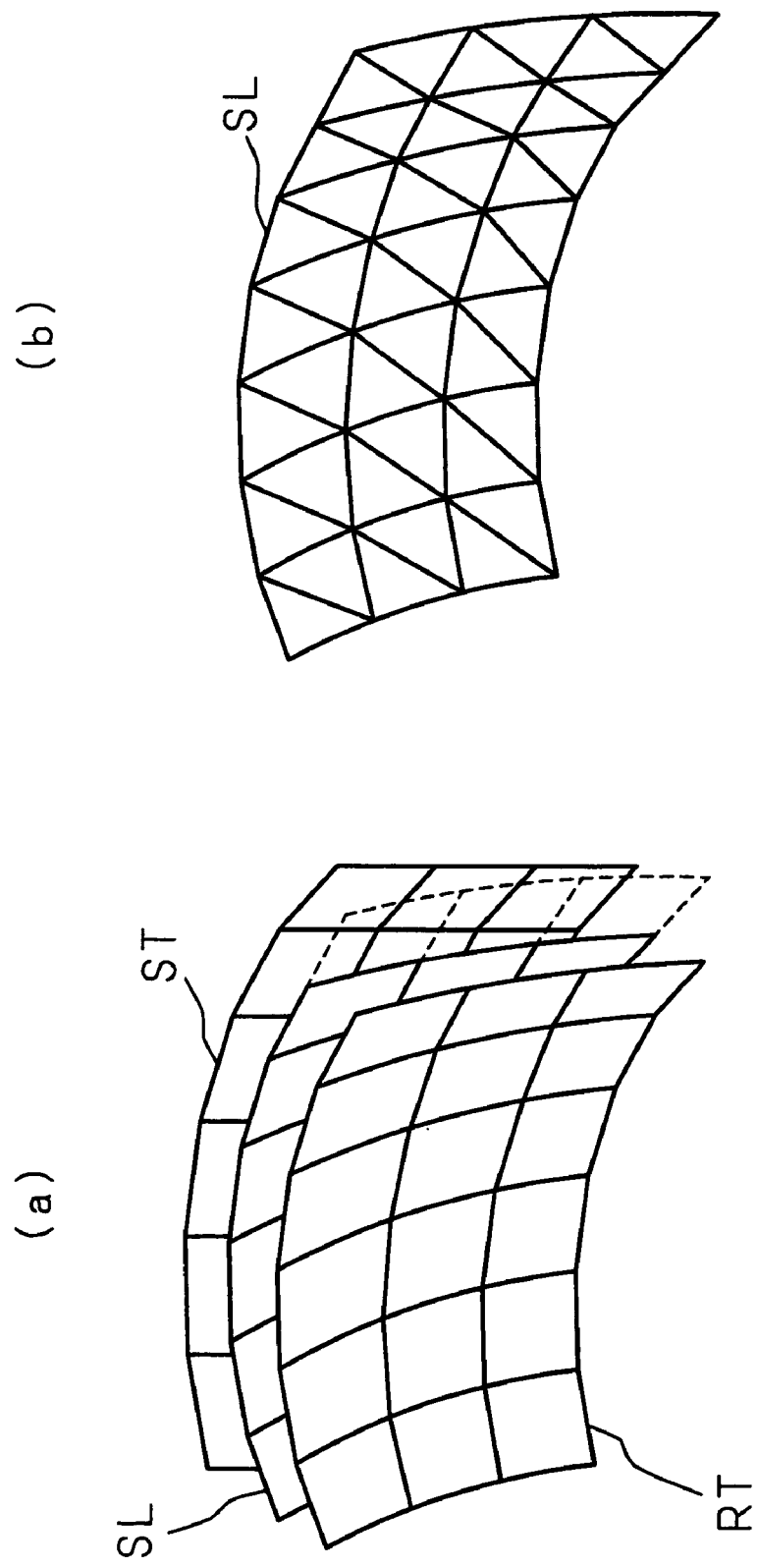
FIG. 9 is a schematic view showing the boundary surface.

Next, the three-dimensional mesh generating apparatus 1 generates a boundary surface in the cylindrical gap G2 (S2). FIG. 8 is a flowchart for explaining the procedure of a sub-routine for generating the boundary surface of step S2, and FIG. 9 is a schematic view showing the boundary surface. As shown in FIG. 9(a), first, the three-dimensional mesh generating apparatus 1 generates a boundary surface SL by projecting, into the cylindrical gap G2, a rotor-side mesh surface RT of the initial three-dimensional mesh on the rotor side which faces the cylindrical gap G2 (S21). At this time, it is also possible to generate the boundary surface SL by projecting a stator-side mesh surface ST facing the rotor-side mesh surface RT with the cylindrical gap G2 therebetween, instead of the rotor-side mesh surface RT, or by setting a cylindrical boundary surface SL first and projecting the mesh of the stator-side mesh surface ST or the rotor-side mesh surface RT onto the set boundary surface SL.

Next, as shown in FIG. 9(b), the three-dimensional mesh generating apparatus 1 divides each of quadrangular surface elements constituting the boundary surface SL into two triangular surface elements arranged in a direction in which the boundary surface SL is twisted with respect to the stator-side mesh surface ST or the rotor-side mesh surface RT so as to produce the boundary surface SL by a combination of the triangular elements (S22), and completes the sub-routine for generating the boundary surface and returns to the main process.

Figure 10:
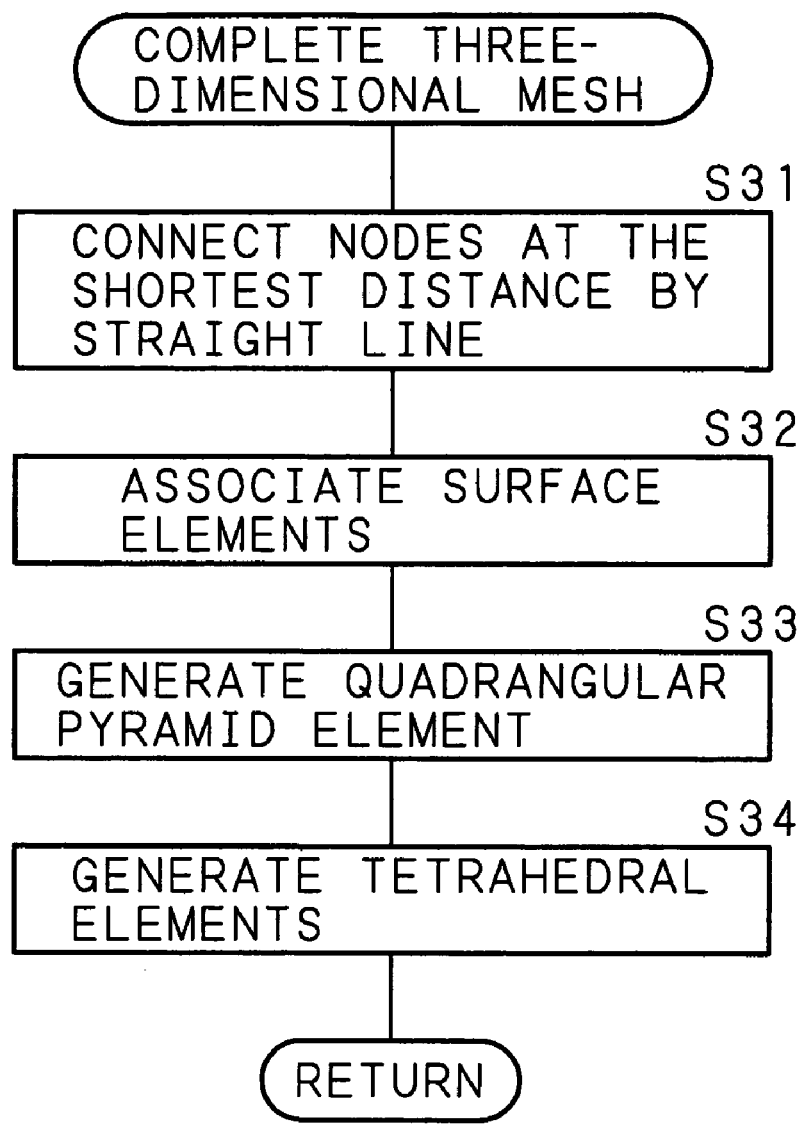
FIG. 10 is a flowchart for explaining the procedure of a sub-routine for completing a three-dimensional mesh.

Next, the three-dimensional mesh generating apparatus 1 fills the cylindrical gap G2 with a plurality of polyhedrons to complete the three-dimensional mesh (S3). FIG. 10 is a flowchart for explaining the procedure of a sub-routine for completing the three-dimensional mesh of step S3. The three-dimensional mesh generating apparatus 1 connects each of the nodes constituting the stator-side mesh surface ST and the rotor-side mesh surface RT to a node on the boundary surface SL located at the shortest distance by a straight line (S31), and associates each of the quadrangular surface elements constituting the stator-side mesh surface ST and the rotor-side mesh surface RT with two triangular surface elements constituting the boundary surface SL connected by the straight lines (S32).

Figure 11:
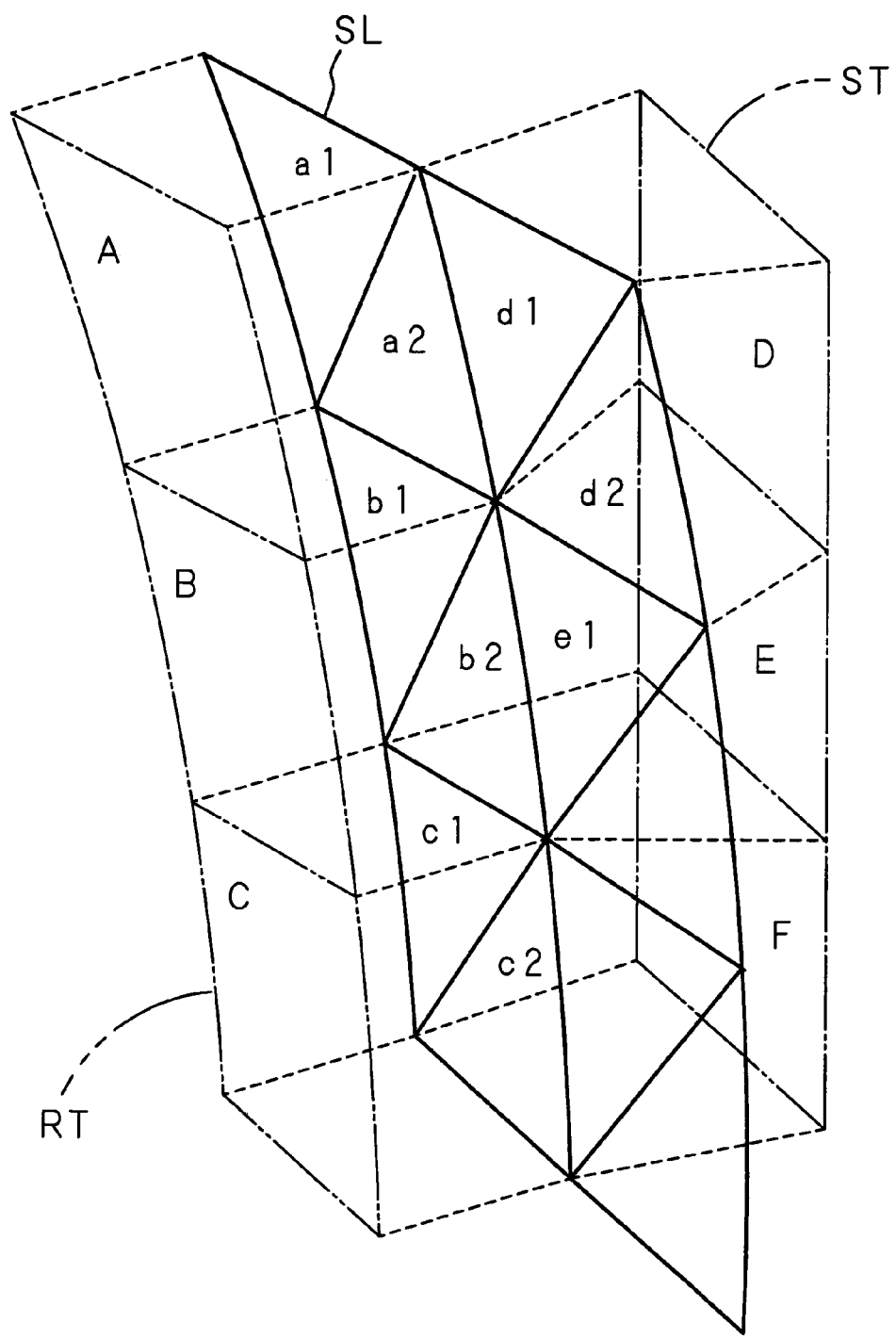
FIG. 11 is a schematic view for explaining an example of correspondence between surface elements.

FIG. 11 is a schematic view for explaining an example of correspondence between surface elements, wherein a part of the stator-side mesh surface ST and the rotor-side mesh surface RT is shown by an alternate long and two short dashes line, a part of the boundary surface SL is shown by a solid line, and the straight line connecting the nodes is shown by a broken line. The nodes of the rotor-side mesh surface RT and the nodes of the boundary surface SL are connected so that the nodes at the shortest distance are connected by a straight line, and quadrangular surface elements A, B and C constituting the rotor-side mesh surface RT correspond respectively to combinations of triangular surface elements a1 and a2, b1 and b2, and c1 and c2 constituting the boundary surface SL. Besides, the nodes of the stator-side mesh surface ST and the nodes of the boundary surface SL are connected so that the nodes at the shortest distance are connected by a straight line, and quadrangular surface elements D, E and F constituting the stator-side mesh surface ST correspond respectively to combinations of triangular surface elements d1 and d2, e1 and b2, and c1 and c2 constituting the boundary surface SL.

Next, the three-dimensional mesh generating apparatus 1 generates a quadrangular pyramid element between corresponding one quadrangular surface element and two triangular surface elements so that the quadrangular surface element is the base (S33), generates four tetrahedral elements including two tetrahedrons having each of the two triangular surface elements as one face (S34), and fills the space between corresponding one quadrangular surface element and two triangular surface elements with one quadrangular pyramid element and four tetrahedral elements.

Figure 12:
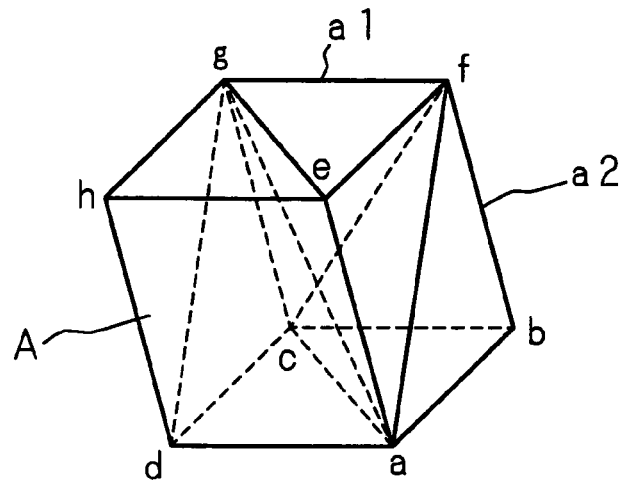
FIG. 12 is a perspective view showing examples of quadrangular elements and tetrahedral elements to be generated.
Figure 12:
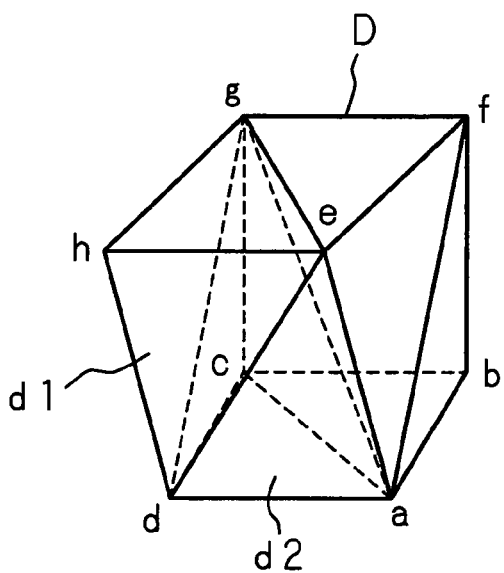
Figure 12:
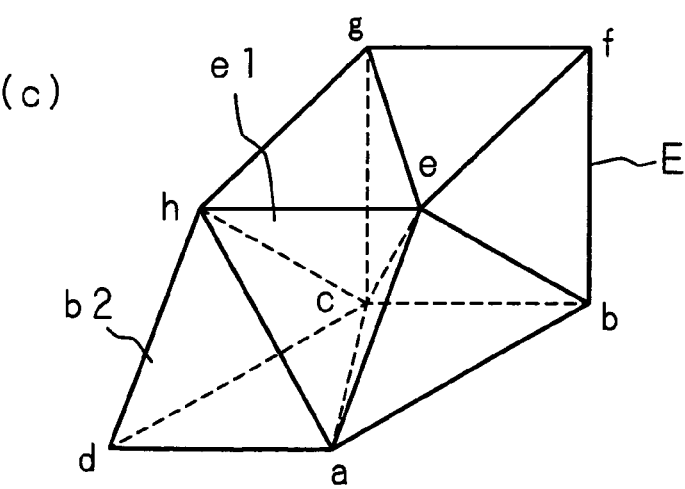

FIG. 12 is a perspective view showing examples of quadrangular elements and a tetrahedral element to be generated. In the space between the surface element A and the surface elements a1 and 1d shown in FIG. 11, as shown in FIG. 12(a), a quadrangular pyramid element "adheg" including a quadrangle "adhe" that is the surface element A as the base, a tetrahedral element "fgca" including a triangle "fgc" that is the surface element a1 as one face, and a tetrahedral element "fbca" including a triangle "fbc" that is the surface element a2 as one face are generated, and further a tetrahedral element "acdg" and a tetrahedral element "aefg" are generated. In the space between the surface element D and the surface elements d1 and d2 shown in FIG. 11, as shown in FIG. 12(b), a quadrangular pyramid element "cbfga" including a quadrangle "cbfg" that is the surface element D as the base, a tetrahedral element "hdeg" including a triangle "hde" that is the surface element d1 as one face, and a tetrahedral element "deag" including a triangle "dea" that is the surface element a2 as one face are generated, and further a tetrahedral element "egfa" and a tetrahedral element "acdg" are generated. In the space between the surface element E and the surface elements e1 and b2 shown in FIG. 11, as shown in FIG. 12(c), a quadrangular pyramid element "cbfge" including a quadrangle "cbfg" that is the surface element E as the base, a tetrahedral element "ahec" including a triangle "ahe" that is the surface element e1 as one face, and a tetrahedral element "dhac" including a triangle "dha" that is the surface element b2 as one face are generated, and further a tetrahedral element "abce" and a tetrahedral element "ehgc" are generated.

Figure 13:
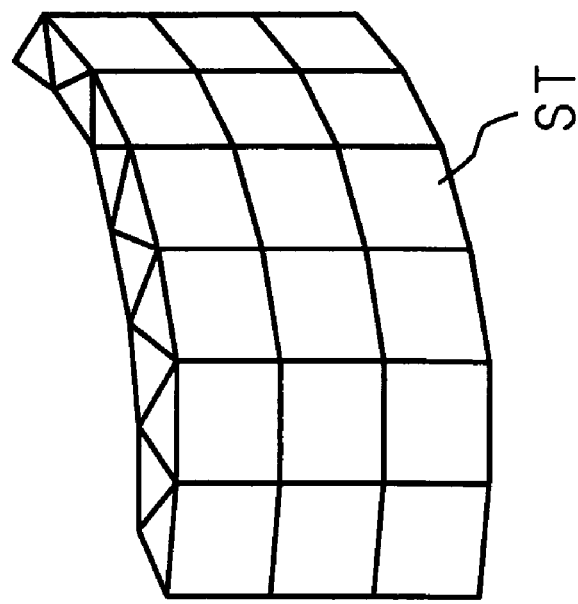
FIG. 13 is a perspective view showing a three-dimensional mesh between a stator-side mesh surface and the boundary surface.
Figure 13:
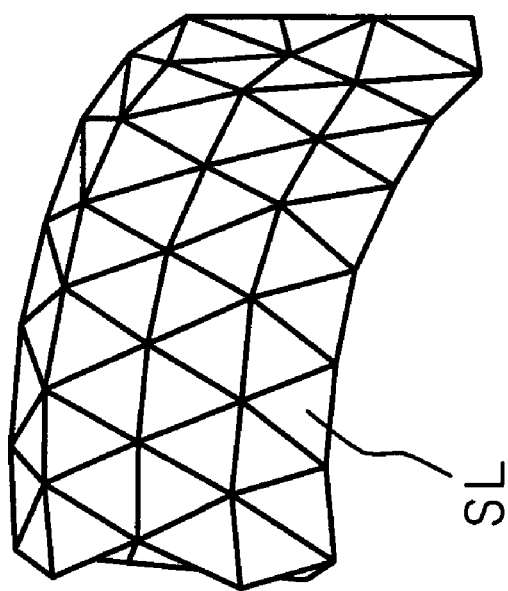
Figure 14:
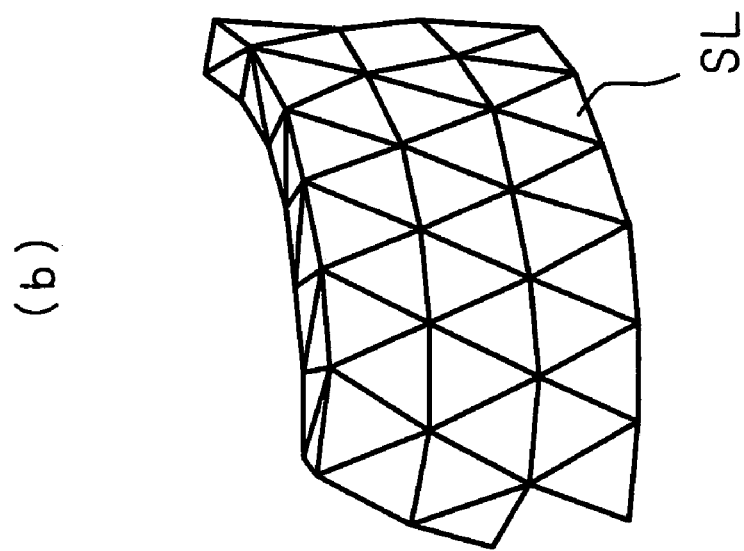
FIG. 14 is a perspective view showing a three-dimensional mesh between a rotor-side mesh surface and the boundary surface.
Figure 14:
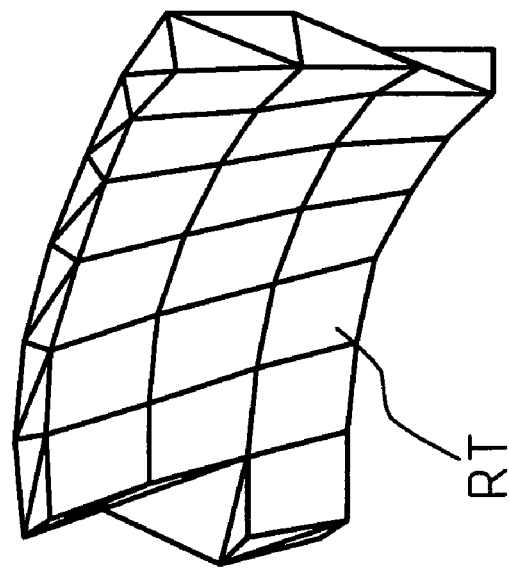
Figure 15:
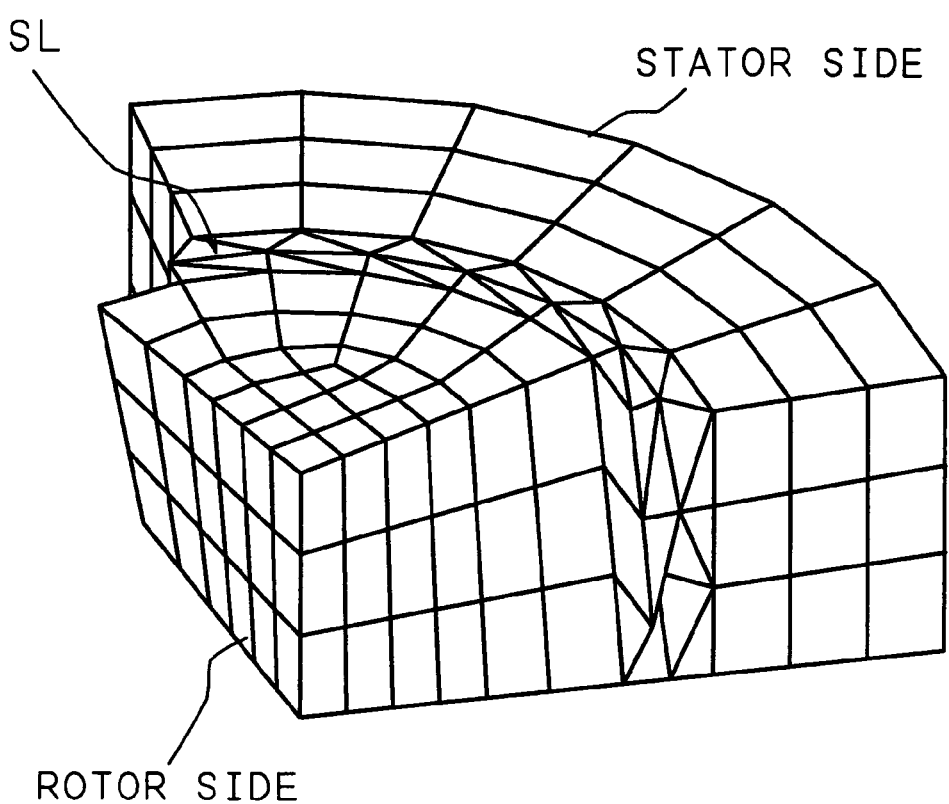
FIG. 15 is a perspective view showing a part of a completed three-dimensional mesh.

By performing the filling periodically in the rotation direction, the spaces between the stator-side mesh surface ST and rotor-side mesh surface RT and the boundary surface SL are represented by combinations of a plurality of polyhedrons, and a three-dimensional mesh representing the rotating machine including the cylindrical gap G2 by combinations of a plurality of polyhedrons is completed. FIG. 13 is a perspective view showing the three-dimensional mesh between the stator-side mesh surface ST and the boundary surface SL, wherein FIG. 13(a) shows the three-dimensional mesh from the boundary surface SL side, and FIG. 13(b) shows the three-dimensional mesh from the stator-side mesh surface ST side. FIG. 14 is a perspective view showing the three-dimensional mesh between the rotor-side mesh surface RT and the boundary surface SL, wherein FIG. 14(a) shows the three-dimensional mesh from the rotor-side mesh surface RT side, and FIG. 14(b) shows the three-dimensional mesh from the boundary surface SL side. The cylindrical gap G2 is filled with a plurality of polyhedrons periodically in the rotation direction. FIG. 15 is a perspective view showing a part of the completed three-dimensional mesh. All the portions including the cylindrical gap G2 are represented by combinations of a plurality of polyhedrons, and the stator-side three-dimensional mesh and the rotor-side three-dimensional mesh match each other at the boundary surface SL.

The three-dimensional mesh generating apparatus 1 finishes the sub-routine for completing a three-dimensional mesh and returns to the main process, thereby completing the processes of generating a three-dimensional mesh.

With the use of the three-dimensional mesh generating apparatus 1 of the present invention, a three-dimensional mesh of a rotating machine having skew is generated by the above-mentioned procedure. An initial three-dimensional mesh is generated by stacking two-dimensional meshes while twisting them, the boundary surface SL is generated between the stator side and the rotor side, and a three-dimensional mesh is generated by filling the space between the stator side and the rotor side with polyhedrons including the respective surface elements constituting the boundary surface SL, so that a three-dimensional mesh with the stator side rotatable from the boundary surface SL can be generated for the rotating machine having skew. Moreover, in the case where the two-dimensional mesh is composed of quadrangles, since portions other than the cylindrical gap G2 are composed of hexahedral elements, the accuracy of calculation performed using the three-dimensional mesh can be improved compared to the case where all the portions are composed of tetrahedral elements. Further, since the portion of the cylindrical gap G2 is filled with a plurality of polyhedrons periodically in the rotation direction, it is possible to give periodicity to the three-dimensional mesh without requiring a special process which is required in the case of using automatic element division.

This embodiment illustrates a method in which two-dimensional meshes are generated first, an initial three-dimensional mesh is generated by stacking the generated two-dimensional meshes while twisting them, and the generated initial three-dimensional mesh is inputted into the three-dimensional mesh generating apparatus 1 to generate a three-dimensional mesh, but it may be possible to directly generate an initial three-dimensional mesh and input the initial three-dimensional mesh into the three-dimensional mesh generating apparatus 1. In this case, the inputted initial three-dimensional mesh is divided so that the stator-side mesh surface ST and the rotor-side mesh surface RT are divided into mutually equal lengths perpendicular to the rotation axis in the direction of the rotation axis, and equally divided into mutually equal number of parts in the direction around the rotation axis, and portions other than portions including the stator-side mesh surface ST and the rotor-side mesh surface RT may be composed of combinations of more irregular polyhedrons, in such a manner that there is a difference in the number or length of the polyhedrons in the direction of the rotation axis between the stator side and the rotor side.

Moreover, although this embodiment illustrates the generation of a three-dimensional mesh for a rotating machine with the rotor having a twisted structure with respect to the rotation axis, the present invention is not limited to this, and it is also possible to generate a three-dimensional mesh in the same manner for a rotating machine with the stator having a twisted structure with respect to the rotation axis by using the present invention. Besides, although the rotating machine with the rotor positioned inside the stator is explained, it is also possible to generate a three-dimensional mesh in the same manner for a rotating machine with the rotor positioned outside the stator. Further, it is also possible to generate a three-dimensional mesh in the same manner for a rotating machine having no skew structure by using the present invention.

Figure 16:
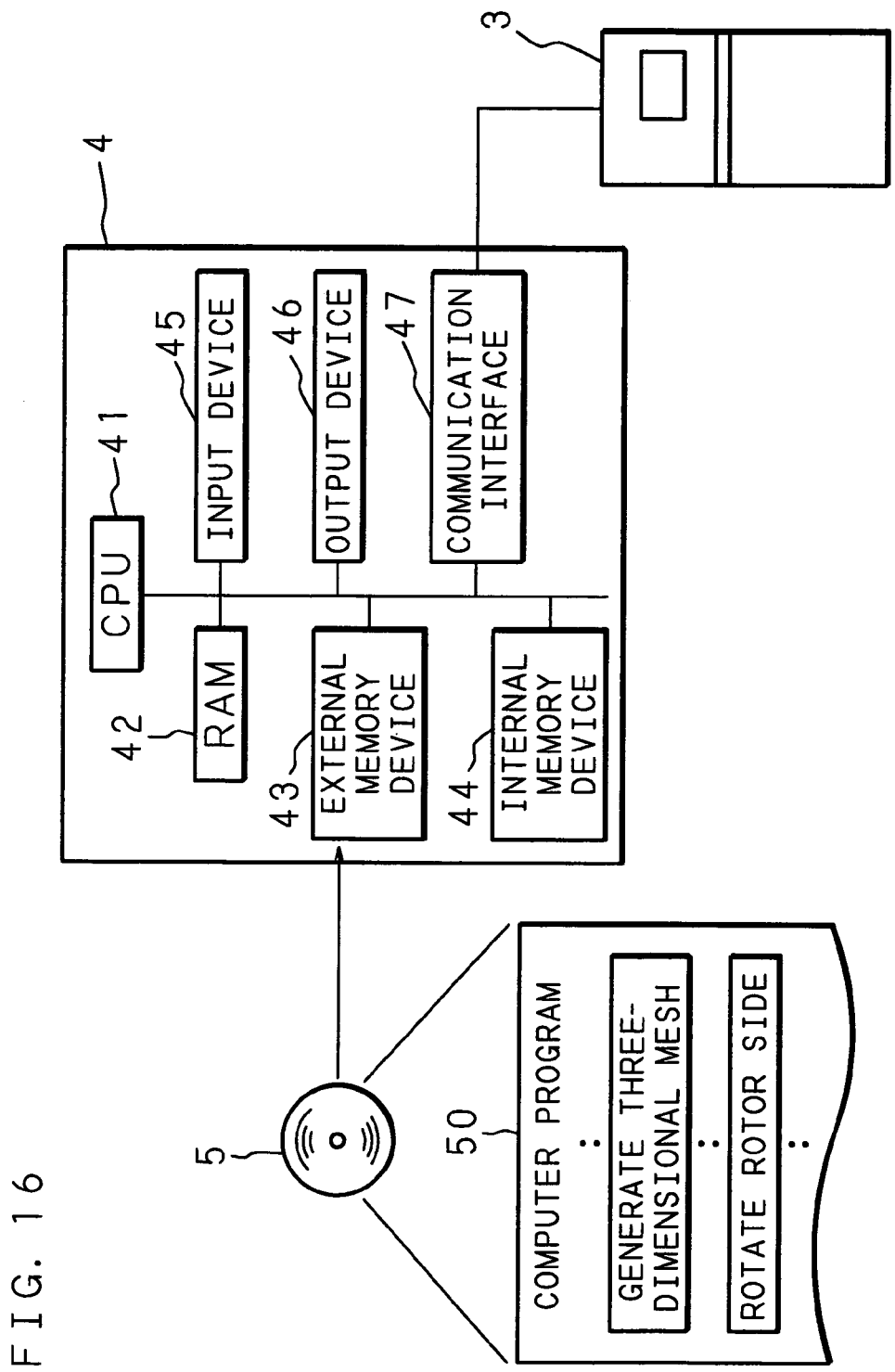
FIG. 16 is a block diagram showing a magnetic field analyzing apparatus for a rotating machine according to the present invention.

Next, the following description will explain the procedure of a method for analyzing the magnetic field of a rotating machine according to the present invention. FIG. 16 is a block diagram showing a magnetic field analyzing apparatus for a rotating machine according to the present invention. In the figure, 4 represents a magnetic field analyzing apparatus for a rotating machine of the present invention implemented using a computer, which comprises: a CPU 41 for performing operations; a RAM 42; an external memory device 43 such as a CD-ROM drive; and an internal memory device 44 such as a hard disk, reads a computer program 50 of the present invention from a memory product 5 such as a CD-ROM of the present invention by the external memory device 43, stores the read computer program 50 into the internal memory device 44, and loads the computer program 50 into the RAM 42, and the CPU 41 executes processes necessary for the magnetic field analyzing apparatus 4 for a rotating machine, based on the computer program 50. The magnetic field analyzing apparatus 4 for a rotating machine comprises an input device 45 such as a keyboard or a mouse, and an output device 46 such as a liquid crystal display or a CRT display, and receives operations, such as input of data, from an operator.

Moreover, the magnetic field analyzing apparatus 4 for a rotating machine comprises a communication interface 47, and may be arranged to download the computer program 50 of the present invention from a server device 3 connected to the communication interface 47 and execute the processes by the CPU 41.

Figure 17:
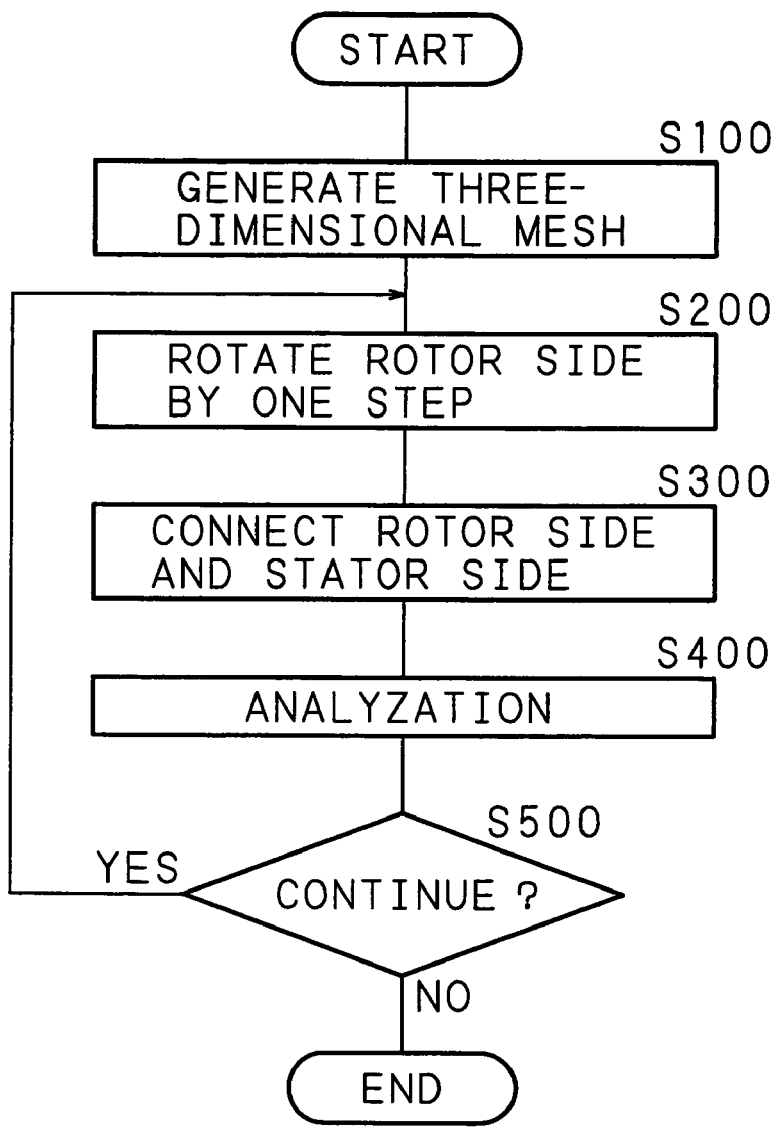
FIG. 17 is a flowchart showing the flow of processes performed by the magnetic field analyzing apparatus for a rotating machine according to the present invention.

FIG. 17 is a flowchart showing the flow of processes performed by the magnetic field analyzing apparatus 4 for a rotating machine according to the present invention. The magnetic field analyzing apparatus 4 for a rotating machine generates a three-dimensional mesh representing a rotating machine to be analyzed by using the above-mentioned three-dimensional mesh generating method (S100), and rotates the rotor side of the generated three-dimensional mesh from the boundary surface SL by one step by shifting the rotor side with respect to the stator side by one element (S200). Next, the magnetic field analyzing apparatus 4 connects the rotor side and the stator side at the boundary surface SL (S300), and analyzes the magnetic field of the rotating machine by using a finite element method (S400). Next, the magnetic field analyzing apparatus 4 decides whether or not to continue the calculation by, for example, receiving an instruction to finish the calculation from the operator (S500), and returns to step S200 and further rotates the rotor side by one step if the calculation continues, or finishes the process if the calculation does not continue.

Figure 18:
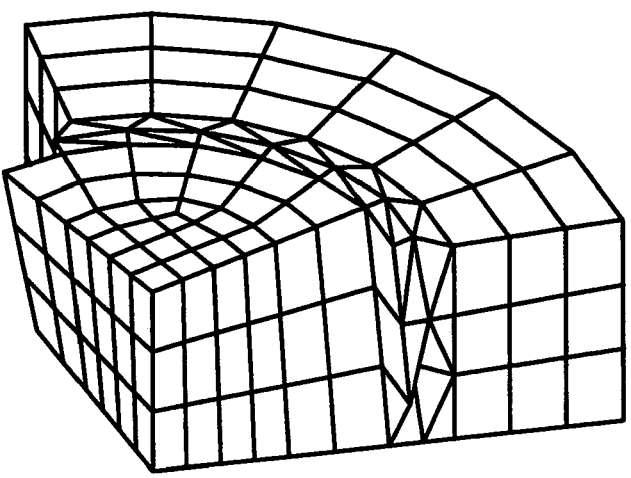
FIG. 18 is a perspective view showing a part of three-dimensional mesh rotated.
Figure 18:
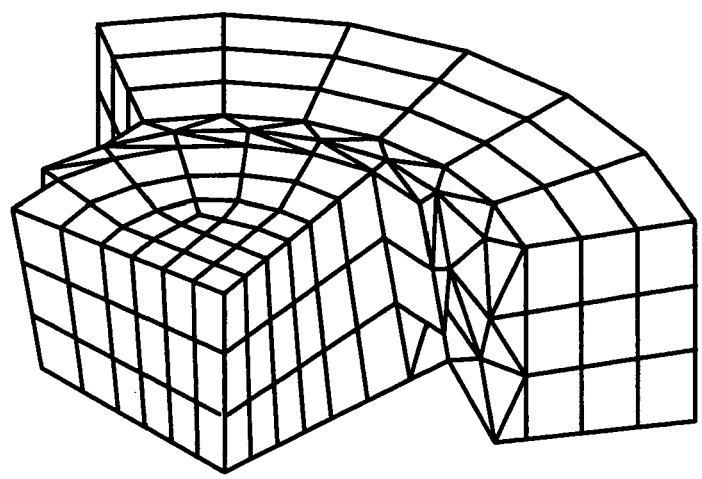
Figure 18:
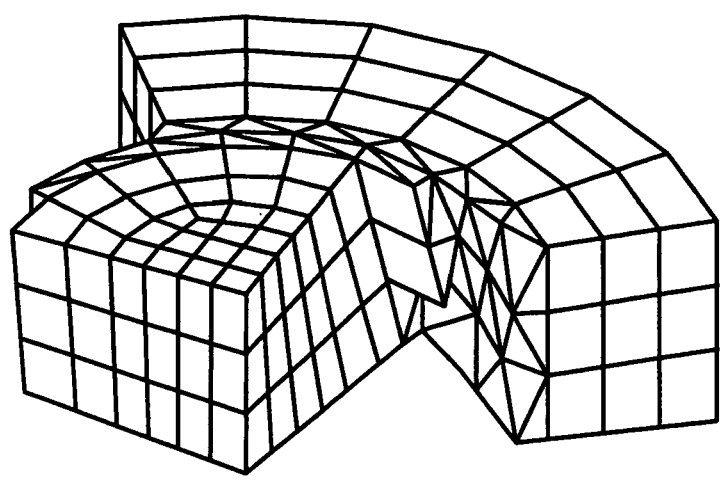

FIG. 18 is a perspective view showing a part of the three-dimensional mesh rotated. The rotor side is shifted from the boundary surface SL in the rotation direction by one element with respect to the stator side from the initial state shown in FIG. 18(a), and thus the rotor side is rotated by one step as shown in FIG. 18(b). In the case where the rotor side is further rotated, the rotor side is further shifted by one element and thus rotated by one step as shown in FIG. 18(c).

By performing analysis as described above, it is possible to analyze the magnetic field of a rotating machine having skew. Since the analysis is performed by rotating the rotor side from the boundary surface SL, the calculation time is shorter compared to a method in which a three-dimensional mesh is generated by an automatic element division method whenever the rotor side is rotated, and, since the regular three-dimensional mesh is used, more accurate calculation can be performed compared to a method using an irregular three-dimensional mesh generated by the automatic element division method.

In this embodiment, although a mode in which the magnetic field analyzing apparatus 4 for a rotating machine comprises means for generating a three-dimensional mesh is illustrated, the present invention is not limited to this mode and may be arranged so that the magnetic field analyzing apparatus 4 for a rotating machine does not comprise means for generating a three-dimensional mesh, receives the input of a three-dimensional mesh generated by the three-dimensional mesh generating apparatus 1, and analyzes the magnetic field of the rotating machine by using the inputted three-dimensional mesh.

INDUSTRIAL APPLICABILITY

As described above, in the present invention, since portions of the stator side and the rotor side of the three-dimensional mesh which come into contact with each other at the boundary surface are composed of elements having mutually equal size in the rotation direction, a three-dimensional mesh that allows rotation of the rotor side by shifting the elements from the boundary surface can be generated even for a rotating machine having skew.

Moreover, the respective elements of the initial three-dimensional mesh are hexahedrons, and the calculation accuracy is improved by using hexahedral elements than by using tetrahedral elements according to the finite element method, and thus it is possible to generate a three-dimensional mesh with high calculation accuracy.

Further, by associating each of the surface elements constituting the stator-side mesh surface and the rotor-side mesh surface, respectively, with surface elements constituting the boundary surface and filling the space between the corresponding surface elements with one quadrangular pyramid and four tetrahedrons, it is possible to make the three-dimensional mesh periodic in the rotation direction without requiring an additional process.

In addition, even for a three-dimensional mesh representing a rotating machine having skew, it is possible to generate a three-dimensional mesh that allows rotation of the rotor side by shifting the elements from the boundary surface, has periodicity in the rotation direction, in high calculation accuracy.

Furthermore, since the magnetic field of the rotating machine is analyzed by the finite element method using the generated three-dimensional mesh, it is possible to perform accurate magnetic field analysis with a shorter calculation time.

What is claimed is:

1. A method for generating a three-dimensional mesh representing a rotating machine with a stator or a rotor having a twisted structure in a direction of a rotation axis of the rotor, including a spatial area between the stator and the rotor, by a combination of a plurality of polyhedrons, comprising steps of:

generating a two-dimensional mesh in which a ring-shaped gap is provided around the rotation axis in the spatial area, portions facing each other with the ring-shaped gap therebetween are equally divided into mutually equal number of parts, and a stator-side portion and a rotor-side portion, excluding the ring-shaped gap, are represented by a combination of a plurality of polyhedrons on a plane perpendicular to the rotation axis;

generating an initial three-dimensional mesh by joining together a plurality of the two-dimensional meshes with the stator-side portion and the rotor-side portion relatively rotated on the rotation axis according to the twisted structure, in the direction of the rotation axis according to a rule which is the same for both the stator-side portion and the rotor-side portion;

forming a boundary surface constructed by a mesh surface obtained by concentrically projecting, into a cylindrical gap composed of a stack of the ring-shaped gaps, any one of a stator-side mesh surface and a rotor-side mesh surface which face each other with the cylindrical gap therebetween; and filling spaces between the boundary surface and the stator-side mesh surface and rotor-side mesh surface with a plurality of polyhedrons, including polyhedrons comprising each of surface elements including the boundary surface, the stator-side mesh surface and the rotor-side mesh surface as one face, to generate the three-dimensional mesh.

2. The three-dimensional mesh generating method according to claim 1, wherein the two-dimensional mesh is composed of a combination of a plurality of quadrangles, and the initial three-dimensional mesh is generated by joining together a plurality of the two-dimensional meshes in the direction of the rotation axis so that corresponding nodes in the two-dimensional meshes are connected by a straight line.

3. The three-dimensional mesh generating method according to claim 2, further comprising steps of:

dividing each of quadrangular elements constituting the boundary surface into two triangular elements arranged in a direction in which the boundary surface is twisted with respect to the stator-side mesh surface or the rotor-side mesh surface;

connecting each of nodes constituting the stator-side mesh surface and the rotor-side mesh surface to a closest node among a plurality of nodes constituting the boundary surface by a straight line; and filling a space between each of surface elements constituting the stator-side mesh surface and rotor-side mesh surface and a combination of the two triangular elements connected to the surface element by straight lines, with four tetrahedrons, including two tetrahedrons comprising each of the two triangular elements as one face, and one quadrangular pyramid comprising the surface element as a base.

4. A method for generating a three-dimensional mesh representing a rotating machine, including a spatial area between a stator and a rotor, by a combination of a plurality of polyhedrons by a computer, comprising steps of:

receiving from an input unit and storing into a storage unit an initial three-dimensional mesh in which a cylindrical gap is provided in the spatial area between the stator and the rotor of the rotating machine, portions facing each other with the cylindrical gap therebetween are divided into mutually equal lengths perpendicular to a rotation axis of the rotating machine in a direction of the ration axis and equally divided into mutually equal number of parts in a direction around the rotation axis, and a stator-side portion and a rotor-side portion of the rotating machine, excluding the cylindrical gap, are represented by a combination of a plurality of polyhedrons;

forming a boundary surface by a mesh surface obtained by concentrically projecting, into the cylindrical gap, any one of a stator-side mesh surface and a rotor-side mesh surface which face each other with the cylindrical gap therebetween, and storing the boundary surface into the storage unit;

dividing each of quadrangular elements constituting the boundary surface into two triangular elements arranged in a direction tilted with respect to each of quadrangular elements constituting the stator-side mesh surface or the rotor-side mesh surface, and storing them into the storage unit;

connecting each of nodes constituting the stator-side mesh surface and the rotor-side mesh surface to a closest node among a plurality of nodes constituting the boundary surface by a straight line, and storing them into the storage unit; and filling a space between each of surface elements constituting the stator-side mesh surface and rotor-side mesh surface and a combination of the two triangular elements connected to the surface element by straight lines, with four tetrahedrons, including two tetrahedrons comprising each of the two triangular elements as one face, and one quadrangular pyramid comprising the surface element as a base, and storing them into the storage unit.

5. A method for analyzing a magnetic field of a rotating machine by a finite element method using a three-dimension mesh representing the rotating machine, including a spatial area between a stator and a rotor, by a combination of a plurality of polyhedrons, comprising steps of:

generating a three-dimensional mesh representing a rotating machine to be analyzed by using the three-dimensional mesh generating method of claim 1;

rotating a rotor side of the three-dimensional mesh by shifting the surface elements from the boundary surface; and analyzing the magnetic field by the finite element method.

6. A method for analyzing a magnetic field of a rotating machine by a finite element method using a three-dimension mesh representing the rotating machine, including a spatial area between a stator and a rotor, by a combination of a plurality of polyhedrons, comprising steps of:

generating a three-dimensional mesh representing a rotating machine to be analyzed by using the three-dimensional mesh generating method of claim 2;

rotating a rotor side of the three-dimensional mesh by shifting the surface elements from the boundary surface; and analyzing the magnetic field by the finite element method.

7. A method for analyzing a magnetic field of a rotating machine by a finite element method using a three-dimension mesh representing the rotating machine, including a spatial area between a stator and a rotor, by a combination of a plurality of polyhedrons, comprising steps of:

generating a three-dimensional mesh representing a rotating machine to be analyzed by using the three-dimensional mesh generating method of claim 3;

rotating a rotor side of the three-dimensional mesh by shifting the surface elements from the boundary surface; and analyzing the magnetic field by the finite element method.

8. A method for analyzing a magnetic field of a rotating machine by a finite element method using a three-dimension mesh representing the rotating machine, including a spatial area between a stator and a rotor, by a combination of a plurality of polyhedrons, comprising steps of:

generating a three-dimensional mesh representing a rotating machine to be analyzed by using the three-dimensional mesh generating method of claim 4;

rotating a rotor side of the three-dimensional mesh by shifting the surface elements from the boundary surface; and analyzing the magnetic field by the finite element method.

9. An apparatus for generating a three-dimensional mesh representing a rotating machine, including a spatial area between a stator and a rotor, by a combination of a plurality of polyhedrons, comprising:

an input device for receiving an initial three-dimensional mesh in which a cylindrical gap is provided in the spatial area between the stator and the rotor of the rotating machine, portions facing each other with the cylindrical gap therebetween are divided into mutually equal lengths perpendicular to a rotation axis of the rotating machine in a direction of the rotation axis and equally divided into mutually equal number of parts in a direction around the rotation axis, and a stator-side portion and a rotor-side portion of the rotating machine, excluding the cylindrical gap, are represented by a combination of a plurality of polyhedrons; and a processor capable of performing operations of:

forming a boundary surface by a mesh surface obtained by concentrically projecting, into the cylindrical gap, any one of a stator-side mesh surface and a rotor-side mesh surface which face each other with the cylindrical gap therebetween;

dividing each of quadrangular elements constituting the boundary surface into two triangular elements arranged in a direction in which the boundary surface is tilted with respect to the stator-side mesh surface or the rotor-side mesh surface;

connecting each of nodes constituting the stator-side mesh surface and the rotor-side mesh surface to a closest node among a plurality of nodes constituting the boundary surface by a straight line; and filling a space between each of surface elements constituting the stator-side mesh surface and rotor-side mesh surface and a combination of the two triangular elements connected to the surface element by straight lines, with four tetrahedrons, including two tetrahedrons comprising each of the two triangular elements as one face, and one quadrangular pyramid comprising the surface element as a base.

10. An apparatus for generating a three-dimensional mesh representing a rotating machine, including a spatial area between a stator and a rotor, by a combination of a plurality of polyhedrons, comprising:

means for receiving an initial three-dimensional mesh in which a cylindrical gap is provided in the spatial area between the stator and the rotor of the rotating machine, portions facing each other with the cylindrical gap therebetween are divided into mutually equal lengths perpendicular to a rotation axis of the rotating machine in a direction of the rotation axis and equally divided into mutually equal number of parts in a direction around the rotation axis, and a stator-side portion and a rotor-side portion of the rotating machine, excluding the cylindrical gap, are represented by a combination of a plurality of polyhedrons;

means for forming a boundary surface by a mesh surface obtained by concentrically projecting, into the cylindrical gap, any one of a stator-side mesh surface and a rotor-side mesh surface which face each other with the cylindrical gap therebetween;

means for dividing each of quadrangular elements constituting the boundary surface into two triangular elements arranged in a direction in which the boundary surface is tilted with respect to the stator-side mesh surface or the rotor-side mesh surface;

means for connecting each of nodes constituting the stator-side mesh surface and the rotor-side mesh surface to a closest node among a plurality of nodes constituting the boundary surface by a straight line; and means for filling a space between each of surface elements constituting the stator-side mesh surface and rotor-side mesh surface and a combination of the two triangular elements connected to the surface element by straight lines, with four tetrahedrons, including two tetrahedrons comprising each of the two triangular elements as one face, and one quadrangular pyramid comprising the surface element as a base.

11. An apparatus for analyzing a magnetic field of a rotating machine by a finite element method using a three-dimensional mesh representing the rotating machine, including a spatial area between a stator and a rotor, by a combination of a plurality of polyhedrons, comprising a processor capable of performing operations of:

generating a three-dimensional mesh representing a rotating machine to be analyzed, by using the three-dimensional mesh generating apparatus of claim 9; and rotating the rotor side of the three-dimensional mesh by shifting the surface elements from the boundary surface, and analyzing the magnetic field by the finite element method.

12. An apparatus for analyzing a magnetic field of a rotating machine by a finite element method using a three-dimensional mesh representing the rotating machine, including a spatial area between a stator and a rotor, by a combination of a plurality of polyhedrons, comprising:

means for generating a three-dimensional mesh representing a rotating machine to be analyzed, by using the three-dimensional mesh generating apparatus of claim 10; and means for rotating the rotor side of the three-dimensional mesh by shifting the surface elements from the boundary surface, and analyzing the magnetic field by the finite element method.

13. A memory product readable by a computer storing a computer program for causing a computer to generate a three-dimensional mesh representing a rotating machine, including a spatial area between a stator and a rotor, by a combination of a plurality of polyhedrons, by using an initial three-dimensional mesh in which a cylindrical gap is provided in the spatial area between the stator and the rotor of the rotating machine, portions facing each other with the cylindrical gap therebetween are divided into mutually equal lengths perpendicular to a rotation axis of the rotating machine in a direction of the rotation axis and equally divided into mutually equal number of parts in a direction around the rotation axis, and a stator-side portion and a rotor-side portion of the rotating machine, excluding the cylindrical gap, are represented by a combination of a plurality of polyhedrons, storing a computer program comprising steps of:

causing the computer to form a boundary surface by a mesh surface obtained by concentrically projecting, into the cylindrical gap, any one of a stator-side mesh surface and a rotor-side mesh surface which face each other with the cylindrical gap therebetween;

causing the computer to divide each of quadrangular elements constituting the boundary surface into two triangular elements arranged in a direction in which the boundary surface is tilted with respect to the stator-side mesh surface or the rotor-side mesh surface;

causing the computer to connect each of nodes constituting the stator-side mesh surface and the rotor-side mesh surface to a closest node among a plurality of nodes constituting the boundary surface by a straight line; and causing the computer to fill a space between each of surface elements constituting the stator-side mesh surface and rotor-side mesh surface and a combination of the two triangular elements connected to the surface element by straight lines, with four tetrahedrons, including two tetrahedrons comprising each of the two triangular elements as one face, and one quadrangular pyramid comprising the surface element as a base.

14. A memory product readable by a computer storing a computer program for causing a computer to analyze a magnetic field of a rotating machine by a finite element method using a three-dimensional mesh representing a rotating machine, including a spatial area between a stator and a rotor, by a combination of a plurality of polyhedrons, storing a computer program comprising steps of:

causing the computer to generate a three-dimensional mesh representing a rotating machine to be analyzed, by using the computer program stored in the memory product of claim 10; and causing the computer to rotate a rotor side of the three-dimensional mesh by shifting the surface elements from the boundary surface and analyze the magnetic field by the finite element method.

* * * * *